(12) United States Patent
Sugimura et al.

(10) Patent No.: US 10,122,870 B2
(45) Date of Patent: Nov. 6, 2018

(54) INFORMATION PROCESSING SYSTEM, INFORMATION PROCESSING APPARATUS, AND INFORMATION PROCESSING METHOD

(71) Applicants: Kazunori Sugimura, Kanagawa (JP); Yuuichiroh Hayashi, Kanagawa (JP)

(72) Inventors: Kazunori Sugimura, Kanagawa (JP); Yuuichiroh Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/042,492

(22) Filed: Feb. 12, 2016

(65) Prior Publication Data

US 2016/0241724 A1    Aug. 18, 2016

(30) Foreign Application Priority Data

Feb. 16, 2015 (JP) .................................. 2015-027292
Nov. 12, 2015 (JP) .................................. 2015-222330

(51) Int. Cl.
 *H04N 1/00* (2006.01)
 *H04N 1/04* (2006.01)

(52) U.S. Cl.
 CPC ..... *H04N 1/00244* (2013.01); *H04N 1/00411* (2013.01); *H04N 1/00962* (2013.01); *H04N 1/04* (2013.01); *H04N 2201/0094* (2013.01)

(58) Field of Classification Search
 CPC combination set(s) only.
 See application file for complete search history.

(56) References Cited

U.S. PATENT DOCUMENTS 7,522,296 B2    4/2009  Ozawa et al.
8,146,152 B2    3/2012  Homma
9,124,733 B2    9/2015  Ando
(Continued)

FOREIGN PATENT DOCUMENTS

JP    2003-157242    5/2003
JP    2006-184955    7/2006
(Continued)

OTHER PUBLICATIONS

Extended European Search Report dated Oct. 17, 2016.

*Primary Examiner* — Helen Zong
(74) *Attorney, Agent, or Firm* — IPUSA, PLLC

(57) ABSTRACT

An information processing system includes an application information memory unit configured to store an identification information piece for identifying an application and a process information piece for executing a series of processes in combination with programs for each of the application executing the series of processes, which uses an electronic data, in collaboration with an external service while associating these; a service process unit configure to receive a request including the identification information piece and an electronic data information piece; and a logic process unit configured to read the process information piece corresponding to the identification information piece included in the request, and execute the series of processes using the electronic data of the electronic data information piece included in the received request and using at least one program from among the programs or any combination of the programs based on the read process information piece.

16 Claims, 31 Drawing Sheets

(56) References Cited

U.S. PATENT DOCUMENTS

| | | | | |
|---|---|---|---|---|
| 9,207,897 | B2 | 12/2015 | Takatsu et al. | |
| 2004/0057076 | A1* | 3/2004 | Hirose | H04N 1/00413 |
| | | | | 358/1.16 |
| 2011/0067026 | A1* | 3/2011 | Nishio | G06F 21/31 |
| | | | | 718/100 |
| 2013/0179208 | A1* | 7/2013 | Chung | G06Q 10/06 |
| | | | | 705/7.15 |
| 2014/0019859 | A1* | 1/2014 | Hashimoto | G06F 17/212 |
| | | | | 715/273 |
| 2014/0123240 | A1* | 5/2014 | Seo | H04L 63/104 |
| | | | | 726/4 |
| 2015/0040188 | A1 | 2/2015 | Takeuchi | |
| 2016/0028904 | A1* | 1/2016 | Nitta | H04N 1/00352 |
| | | | | 358/474 |

FOREIGN PATENT DOCUMENTS

| | | |
|---|---|---|
| JP | 4039191 | 1/2008 |
| JP | 4124001 | 7/2008 |
| JP | 4154791 | 9/2008 |
| JP | 2013-176113 | 9/2013 |
| JP | 2013-242848 | 12/2013 |
| JP | 5382195 | 1/2014 |
| JP | 2014-032659 | 2/2014 |

\* cited by examiner

FIG.5A

| COMMON I/F OF FILE PROCESS UNIT | |
|---|---|
| COMMON I/F | SUMMARY |
| /EXTERNAL SERVICE NAME/process/file | ACQUIRING FILE FROM DESIGNATED STORAGE SERVICE |
| /EXTERNAL SERVICE NAME/process/folder | STORING FILE IN DESIGNATED STORAGE SERVICE |
| ... | ... |

FIG.5B

| UNIQUE I/F OF FILE PROCESS UNIT | |
|---|---|
| UNIQUE I/F | SUMMARY |
| /EXTERNAL SERVICE NAME/process/extension/attach | ADDING FILE TO DOCUMENT STORED IN DESIGNATED STORAGE SERVICE |
| ... | ... |

FIG.5C

COMMON I/F OF DATA PROCESS UNIT

| COMMON I/F | SUMMARY |
|---|---|
| /EXTERNAL SERVICE NAME/data/files | ACQUIRING FILE VIEW FROM DESIGNATED STORAGE SERVICE |
| /EXTERNAL SERVICE NAME/data/folders | ACQUIRING FOLDER VIEW FROM DESIGNATED STORAGE SERVICE |
| ... | ... |

FIG.5D

UNIQUE I/F OF DATA PROCESS UNIT

| UNIQUE I/F | SUMMARY |
|---|---|
| /EXTERNAL SERVICE NAME/data/extension/images | ACQUIRING IMAGE FILE VIEW FROM DESIGNATED STORAGE SERVICE |
| ... | ... |

FIG.6A

```
SCAN DELIVERY SERVICE

[
  {
    "data_id" : 1,
    "data_key" : "storage_filename",
    "format" : "input_text",
    "data_source" : null
  },
  {
    "data_id" : 2,
    "data_key" : "storage_targetfolder",
    "format" : "select",
    "data_source" : http://sample.xxx.co.jp/service-a/data/folders
  }
]
```

1101 — first object
1102 — second object

FIG.6B

```
CLOUD PRINT SERVICE

[
  {
    "data_id" : 1,
    "data_key" : "storage_targetfiles",
    "format" : "select",
    "data_source" : http://sample.xxx.co.jp/service-a/data/files
  }
]
```

SCAN DELIVERY SERVICE

```
[
  {
    "data_id" : 1,
    "display_name" : "FILE NAME",      } 1301
    "layout" : {
      "order" : 1
    }
  },
  {
    "data_id" : 2,
    "display_name" : "SELECTION OF STORAGE DESTINATION FOLDER SELECTION",   } 1302
    "layout" : {
      "order" : 2
    }
  }
]
```

FIG.7B

```
CLOUD PRINT SERVICE

[
  {
    "data_id" : 1,
    "display_name" : "PRINT TARGET FILE SELECTION",   ⎫
    "layout" : {                                       ⎬ 1401
       "order" : 1                                     ⎭
    }
  }
]
```

FIG.8A

```
SCAN DELIVERY SERVICE

From("file : input")
    .to("process : ocr")
    .to("storage : send_to_folder ? type=service-a")
```

FIG.8B

```
CLOUD PRINT SERVICE

From("file : input")
    .to("storage : recieve_file ? type=service-a")
    .to("process : conv")
```

FIG.10B

```
<html>
  <head>
    ...
  </head>
  <body>
    <h1>Scan Sample</h1>

<p><label>FILE NAME</label>
    <input id="storage_filename" type="text" name="storage_filename"/></p>         ⎫ 2101
    <p><label>SELECTION OF STORAGE DESTINATION FOLDER</label>
    <select id="storage_targetfolder" name="targetfolder" >
         <option value="folder_id_a">FolderA</option>
         <option value="folder_id_b">FolderB</option>
    </select></p>                                                                  ⎫ 2102
    <p><button onclick="scan_function()">Scan</button></p>

</body>
</html>
```

| DATA TYPE BEFORE CONVERSION | DATA TYPE AFTER CONVERSION | TYPE CONVERSION TO BE GENERATED |
|---|---|---|
| InputStream | LocalFilePath | FIRST TYPE CONVERSION |
| LocalFilePath | File | SECOND TYPE CONVERSION |
| ... | ... | ... |

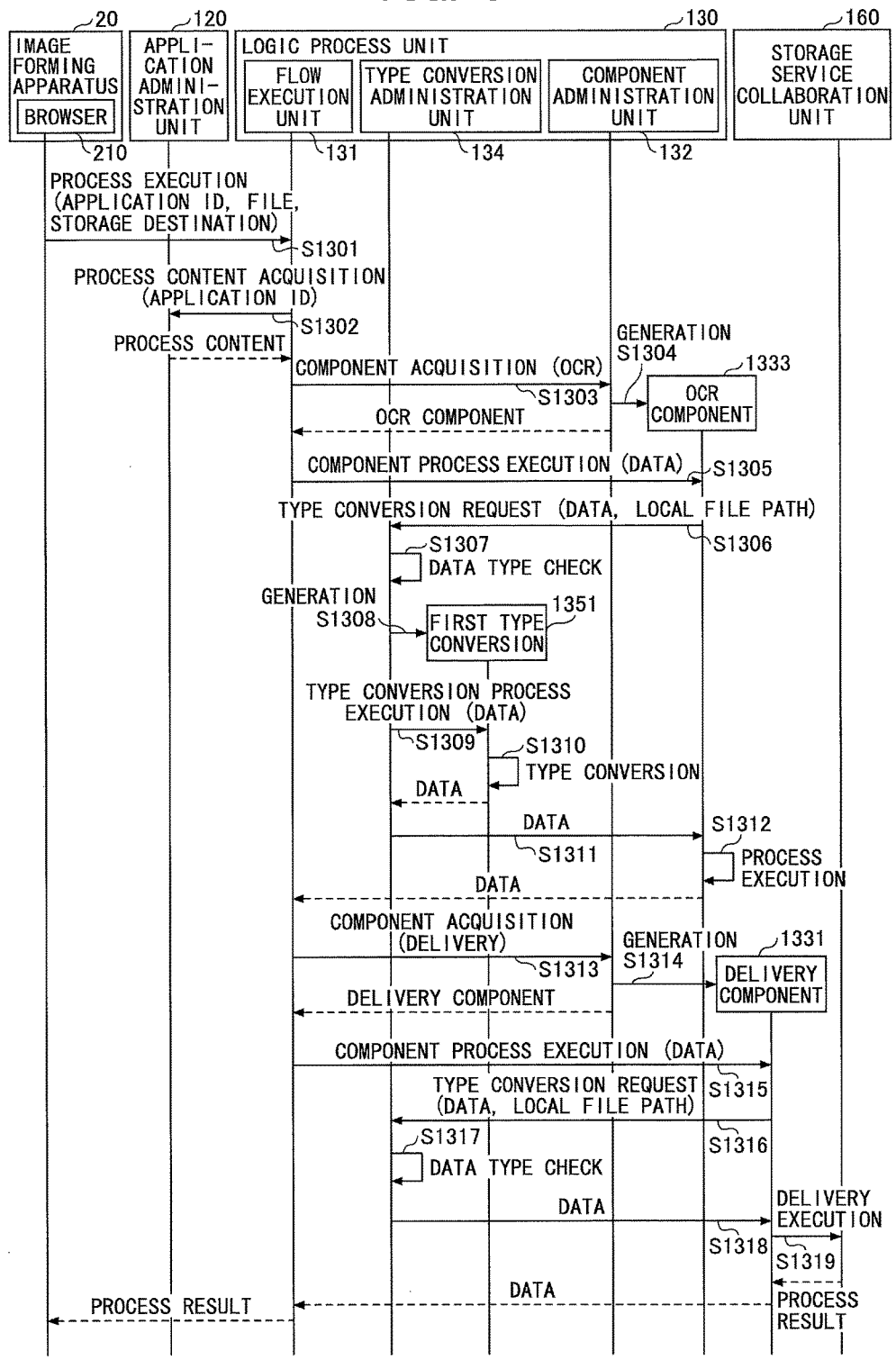

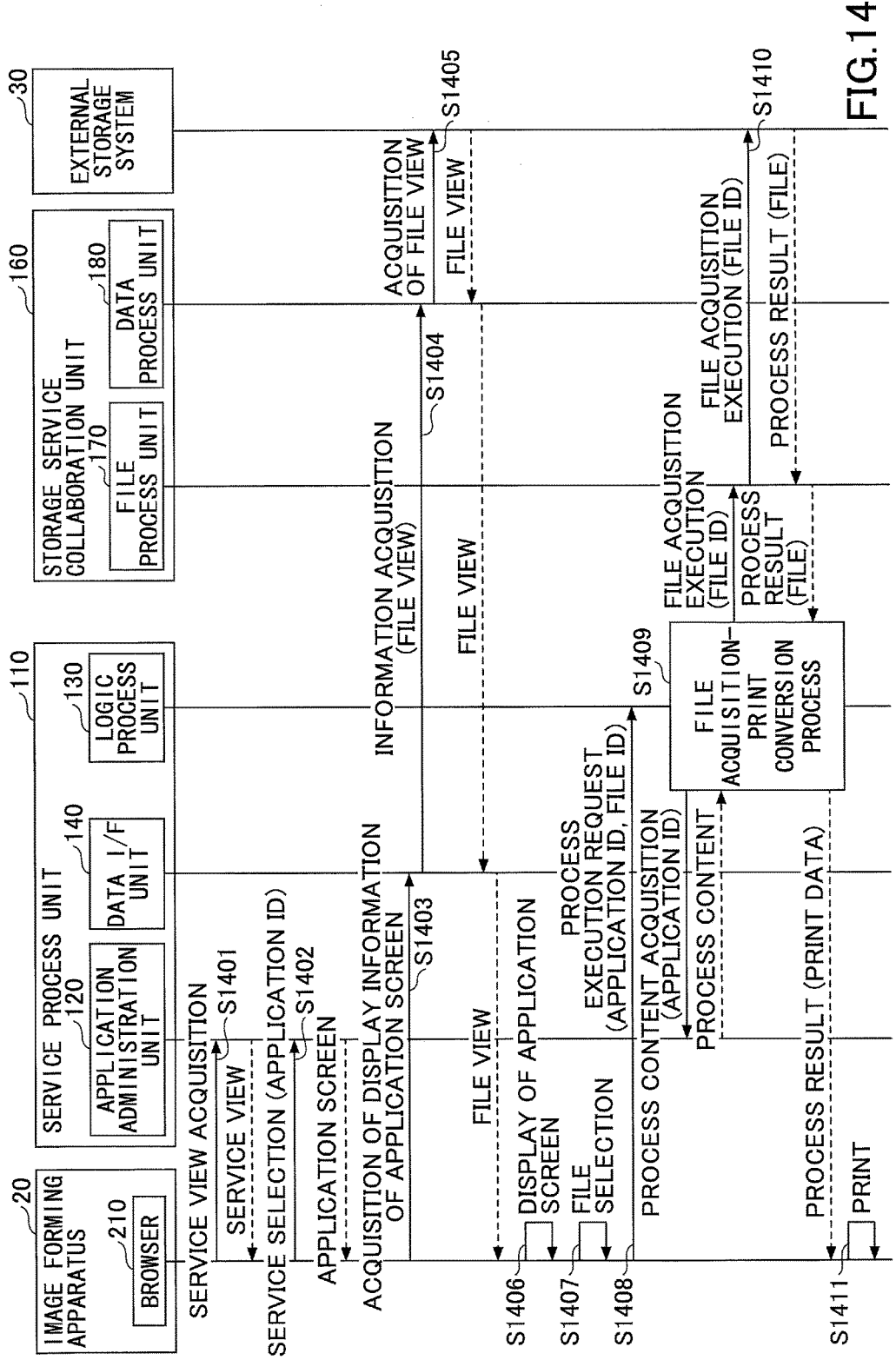

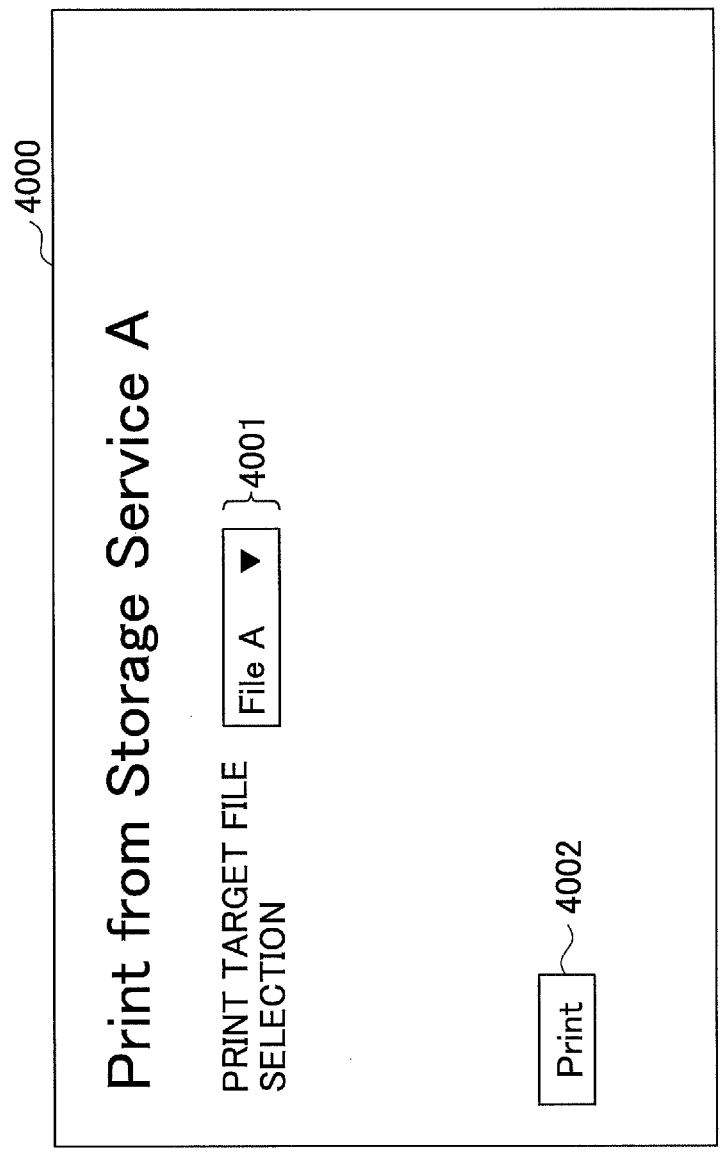

FIG.15B

```
<html>
    <head>
    ...
    </head>
    <body>
        <h1>Print Sample</h1>

<p><label>PRINT TARGET FILE SELECTION</label>
        <select id="storage_targetfiles" name="storage_targetfiles" >    ⎫
            <option value="file_id_a">FileA</option>                     ⎬ 4101
            <option value="file_id_b">FileB</option>                     ⎭
        </select></p>
        <p><button onclick="print_function()">Print</button></p>

</body>
</html>
```

FIG.22

| COMPONENT ID | COMPONENT NAME | HOST NAME |
|---|---|---|
| 0001 | send_to_folder | local host |
| 0002 | recieve_file | local host |
| 0003 | ocr | local host |
| 0004 | conv | local host |
| 0005 | send_to_folder α | server2.com |
| 0006 | conv β | server2.com |
| ... | ... | ... |

| DATA TYPE BEFORE CONVERSION | DATA TYPE AFTER CONVERSION | TYPE CONVERSION TO BE GENERATED |
|---|---|---|
| InputStream | LocalFilePath | FIRST TYPE CONVERSION |
| LocalFilePath | File | SECOND TYPE CONVERSION |
| ... | ... | ... |

FIG.26

```
From("file : input")
.to("process : ocr")
.to("storage : send_to_folder α ? type=service-b")
```

INFORMATION PROCESSING SYSTEM, INFORMATION PROCESSING APPARATUS, AND INFORMATION PROCESSING METHOD

BACKGROUND OF THE INVENTION

1. Field of the Invention

The present invention relates to an information processing system, an information processing apparatus, and an information processing method.

2. Description of the Related Art

In recent years, various external services are provided by cloud computing or the like. For example, there is known an external service, in which electronic data designated by a user are stored in an external storage, or the like.

For example, there is a technique of storing image data, which are acquired by scanning an original manuscript using an image forming apparatus, in an external storage (for example, Patent Document 1). There is such a technique that a process is conducted while associating the image forming apparatus with the external service.

Patent Document 1: Japanese Laid-Open Patent Publication No. 2014-032659

However, in the above technique, an application installed in the image forming apparatus need be developed in order to conduct the process in collaboration with the external service. Further, in a case where a certain external service uses a unique function (a function which is not provided by another external service), it is necessary to develop a module, a plug-in, or the like, which is provided to use the unique function. Therefore, there may be a case where a man-hour necessary for a development such as an addition and a modification of the application installed in the image forming apparatus increases.

SUMMARY OF THE INVENTION

For example, the embodiments of the present invention are provided in consideration of the above, and the object of the embodiments is to support the development of the application for conducting a process in collaboration with the embodiments.

One aspect of the embodiments of the present invention may be to provide an information processing system, which includes at least one information processing apparatus and also includes a plurality of programs each executing a predetermined process, the information processing system includes an application information memory unit configured to store an identification information piece for identifying an application and a process information piece for executing a series of processes in combination with the plurality of programs for each of the application executing the series of processes, which uses an electronic data, in collaboration with an external service while associating the identification information piece and the process information piece; a service process unit configure to receive a request including the identification information piece and an electronic data information piece of the electronic data used for the series of processes from one apparatus from among at least one apparatus connected to the information processing system; and a logic process unit configured to read the process information piece stored in the application information memory unit corresponding to the identification information piece included in the request received by the service process unit, and execute the series of processes using the electronic data of the electronic data information piece included in the request received by the service process unit and using at least one program from among the plurality of programs or any combination of the plurality of programs based on the read process information piece.

BRIEF DESCRIPTION OF THE DRAWINGS

FIGS. 5A to 5D illustrate an exemplary common I/F and a unique I/F.

FIGS. 6A and 6B illustrate an exemplary data definition.

FIGS. 7A and 7B illustrate exemplary layout information.

FIGS. 8A and 8B illustrate an exemplary process content.

FIG. 12 illustrates an exemplary type conversion table.

FIG. 13 is a sequence chart of an exemplary process from an OCR to a delivery execution of the first embodiment.

FIG. 14 is a sequence chart of an exemplary overall process of a cloud print service of the first embodiment.

FIGS. 15A and 15B illustrate an exemplary application screen for using the cloud print service.

FIG. 22 illustrates an exemplary component administration table.

FIG. 24 illustrates an exemplary type conversion table.

FIG. 26 illustrate another exemplary process content.

DETAILED DESCRIPTION OF THE PREFERRED EMBODIMENTS

A description is given below, with reference to the FIG. 1 through FIG. 29 of embodiments of the present invention.

Where the same reference symbols are attached to the same parts, repeated description of the parts is omitted.

Reference symbols typically designate as follows:
1: information processing system;
10: service providing system;
20: image forming apparatus;
30: external storage system;
110: service process unit;
120: application administration unit;
130: logic process unit;
131: flow execution unit;
132: component administration unit;
133: component group;
134: type conversion administration unit;
135: type conversion group;
140: data I/F unit;
150: document service unit;
151: OCR process;
152: print conversion process;
160 storage service collaboration unit;
170: file process unit;
180: data process unit;
190: application information memory unit;
1000: application information; and
3000: type conversion table.

First Embodiment

<System Structure>

Figure 1:
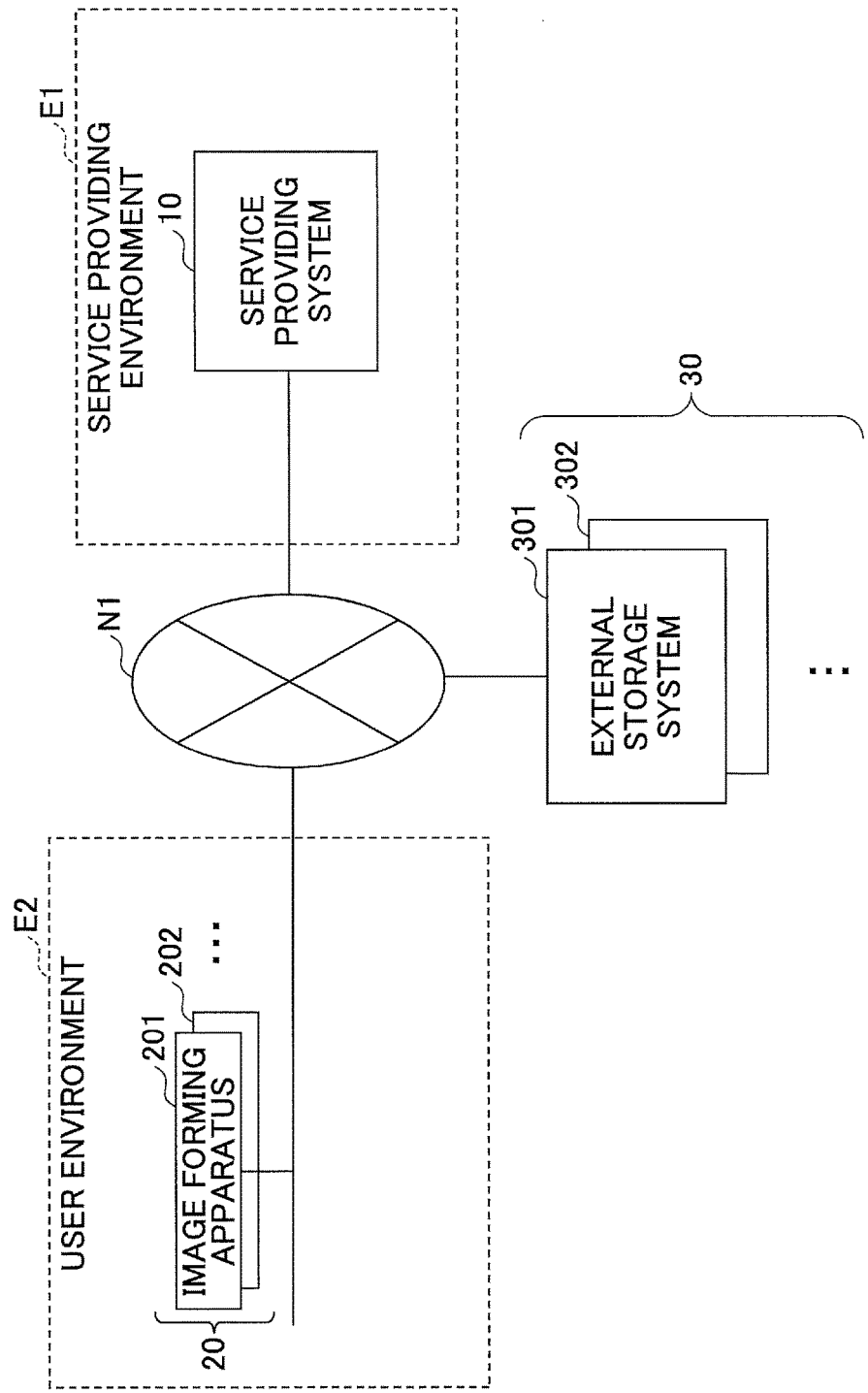
FIG. 1 illustrates a structure of an exemplary information processing system of a first embodiment.

FIG. 1 illustrates an exemplary structure of an information processing system of a first embodiment. In the information processing system 1 illustrated in FIG. 1, a service providing environment E2, a user environment E1, an external storage system 30, and so on are communicable through a wide area network N1 such as the Internet.

The service providing environment E1 is a system environment which provides an external service such as a cloud service through the network. Within the first embodiment, the cloud service is adopted for description as a specific example of the external service. However, the first embodiment can be applied to a service provided through the network such as a service provided by an application service provider (ASP), a web service, and so on.

The service providing environment E2 includes a service providing system 10 including at least one information processing apparatus. The service providing system 10 provides a predetermined service through the network. For example, the service providing system 10 provides a service (a scan delivery service), in which an electronic file generated by scanning an original manuscript in the image forming apparatus 20 of a user environment E2 is subjected to an Optical Character Reader (OCR) process and stored in the external storage system 30. Further, for example, the service providing system 10 provides a service (a cloud print service) of printing the electronic file, which is stored in the external storage system 30, using the image forming apparatus 20 of the user environment E2. Within the first embodiment, the service providing system 10 provides this scan delivery service and a cloud print service in the following description.

However, the service provided by the service providing system 10 is not limited to this and may be a service of projecting the electronic file stored in the external storage system 30 using the projector in the user environment E2, for example. Further, the service may be such that, after the electronic file, which is acquired by scanning the original manuscript using the image forming apparatus 20, the acquired electronic file undergoes the OCR process, the undergone electronic file is translated to a predetermined language (for example, English to Japanese) and stored in the external storage system 30.

All or a part of the service providing system 10 may be installed in the user environment E2. Said differently, all or a part of the information processing apparatus forming the service providing system 10 may be included in the user environment E2.

The user environment E2 is, for example, a system environment in a company such as a user using the image forming apparatus 20. To the user environment E2, at least one image forming apparatuses 20 is connected through a network such as a Local Area Network (LAN) or the like.

The image forming apparatus 20 of the first embodiment is an image forming apparatus having a print function and a scan function. The image forming apparatus 20 may be a multifunction peripheral or the like having a copy function, a facsimile (FAX) communication function, and so on in addition to the print function and the scan function.

The external storage system 30 is a computer system providing a cloud service called a storage service or an online storage through the network. The storage service is a service of lending a memory area of a storage of the external storage system 30. Within the first embodiment, in the scan delivery service, the electronic file undergoing the OCR process is stored (uploaded) in the memory area lent by the external storage system 30. Within the first embodiment, in a cloud print service, the electronic file to be printed is acquired (downloaded) from the memory area lent by the external storage system 30. Hereinafter, when each of multiple external storage systems 30 is distinguished, it is referred to as an "external storage system 301", an "external storage system 302", etc. Further, the name of the service provided by the external storage system 301 is referred to as a "storage service A", and the service name provided by the external storage system 302 is referred to as a "storage service B".

The external storage system 30 may be a system formed by multiple information processing apparatuses. The structure of the information processing system 1 illustrated in FIG. 1 is an example and may be another structure. For example, as described above, the user environment E2 may include various apparatuses such as a projector and an electronic blackboard in addition to or in place of the image forming apparatus 20.

<Hardware Structure>

<<Service Providing System>>

Figure 2:
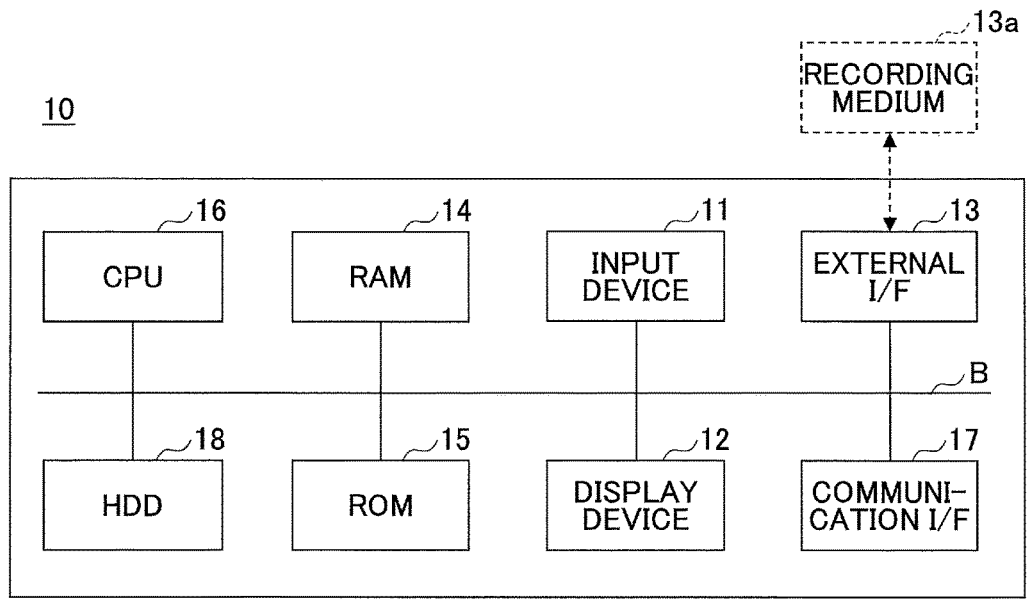
FIG. 2 illustrates a hardware structure of an exemplary service providing system of the first embodiment.

The service providing system 10 illustrated in FIG. 1 has a hardware structure as illustrated, for example, FIG. 2. FIG. 2 illustrates a hardware structure of an exemplary service providing system of the first embodiment. The service providing system 10 illustrated in FIG. 2 includes an input device 11, a display device 12, an external I/F 13, and a Random Access Memory (RAM) 14. Further, the service providing system 10 includes a Read Only Memory (ROM) 15, a Central Processing Unit (CPU) 16, a communication I/F 17, and a Hard Disk Drive (HDD) 18. These hardware apparatuses are connected by a bus B.

The input device 11 includes a keyboard, a mouse, a touch panel, and the like, by which the user input various operation signals. The display device 12 includes a display or the like to display a process result acquired by the service providing system 10. The input device 11 and/or the display device 12 may be in a mode of connecting to the service providing system 10 when necessary and to use he input device 11 and/or the display device 12.

The communication I/F 17 is an interface provided to connect the service providing system 10 with the network N1. Thus, the service providing system 10 can perform data communications with another apparatus through the communication I/F 17.

The HDD 18 is an exemplary non-volatile memory device that stores a program and/or data. The stored program and data are an Operating System (OS), which is basic software controlling the entire service providing system 10, application software providing various functions in the OS, and so on. The service providing system 10 may use a drive device using a flash memory (e.g., a solid state drive (SSD)) as a memory medium in place of the HDD 18. Further, the HDD 18 administers the stored program and the stored data using a predetermined file system and/or a predetermined database (DB).

The external I/F 13 is an interface with an external apparatus. The external apparatus is a recording medium 13a or the like. With this, the service providing system 10 can read information from the recording medium 13a and/or write information to the recording medium 13a through the external I/F 13. The recording medium 13a is a flexible disk, a CD, a DVD, an SD memory card, a USB memory, or the like.

The ROM 15 is a non-volatile semiconductor memory (a memory device), which can hold a program and/or data even when a power source is powered off. The ROM 15 stores a program and data such as Basic Input/Output system (BIOS), OS setup, network setup, or the like, which are executed at a time of booting up the computer system 10. The RAM 14 is a volatile semiconductor memory (a memory device) temporarily storing a program and/or data.

The CPU 16 reads the program and/or data from the memory device such as the ROM 15 and the HDD 18. The read program or the read data undergo a process to thereby substantialize a control or a function of the entire service providing system 10.

The service providing system 10 of the first embodiment can substantialize various processes described below using the above hardware structure of the service providing system 10.

<<Image Forming Apparatus>>

Figure 3:
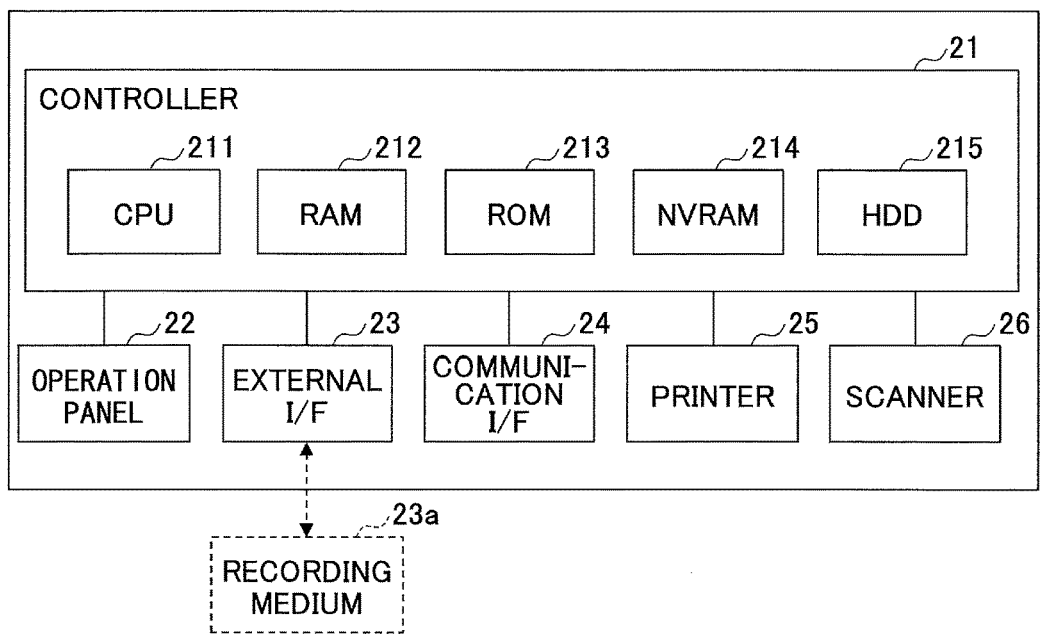
FIG. 3 illustrates a hardware structure of an exemplary image forming apparatus of the first embodiment.

The image forming apparatus 20 illustrated in FIG. 1 has a hardware structure illustrated in, for example, FIG. 3. FIG. 3 illustrates an exemplary hardware structure of the image forming apparatus 10 of the first embodiment. The image forming apparatus 20 illustrated in FIG. 3 includes a controller 21, an operation panel 22, an external I/F 23, a communication I/F 24, a printer 25, and a scanner 606. The controller 21 includes a CPU 211, a RAM 212, a ROM 213, a NVRAM 214, and a HDD 215. Various programs and data are stored in the ROM 213. The RAM 212 temporarily stores the program and the data. Setup information or the like is stored in the NVRAM 214. Various programs and data are stored in the HDD 215.

The CPU 211 reads the program, the data, setup information, or the like into the RAM 212 from the ROM 213, the NVRAM 214, the HDD 215, or the like, and performs the process. Thus, the CPU 211 substantializes an entire control or functions of the image forming apparatus 20.

The operation panel 22 includes an input unit for receiving an input from the user and a display unit for a display. The external I/F 23 is an interface with an external apparatus. The external apparatus is a recording medium 23a or the like. With this, the image forming apparatuses 20 can read information from the recording medium 23a and/or write information to the recording medium 23a through the external I/F 23. The recording medium 23a is an IC card, a flexible disk, a CD, a DVD, an SD memory card, a USB memory, or the like.

The communication I/F 24 is an interface provided to connect the image forming apparatus 20 with the network N1. Thus, the image forming apparatus 20 can perform data communications with another apparatus through the communication I/F 24. The printer 25 is provided for printing print data. The scanner 26 is a reading apparatus which reads an original manuscript and generates an image file (an electronic file).

The image forming apparatus 20 of the first embodiment can perform various processes described below with the above hardware structure.

<Software Structure>

Figure 4:
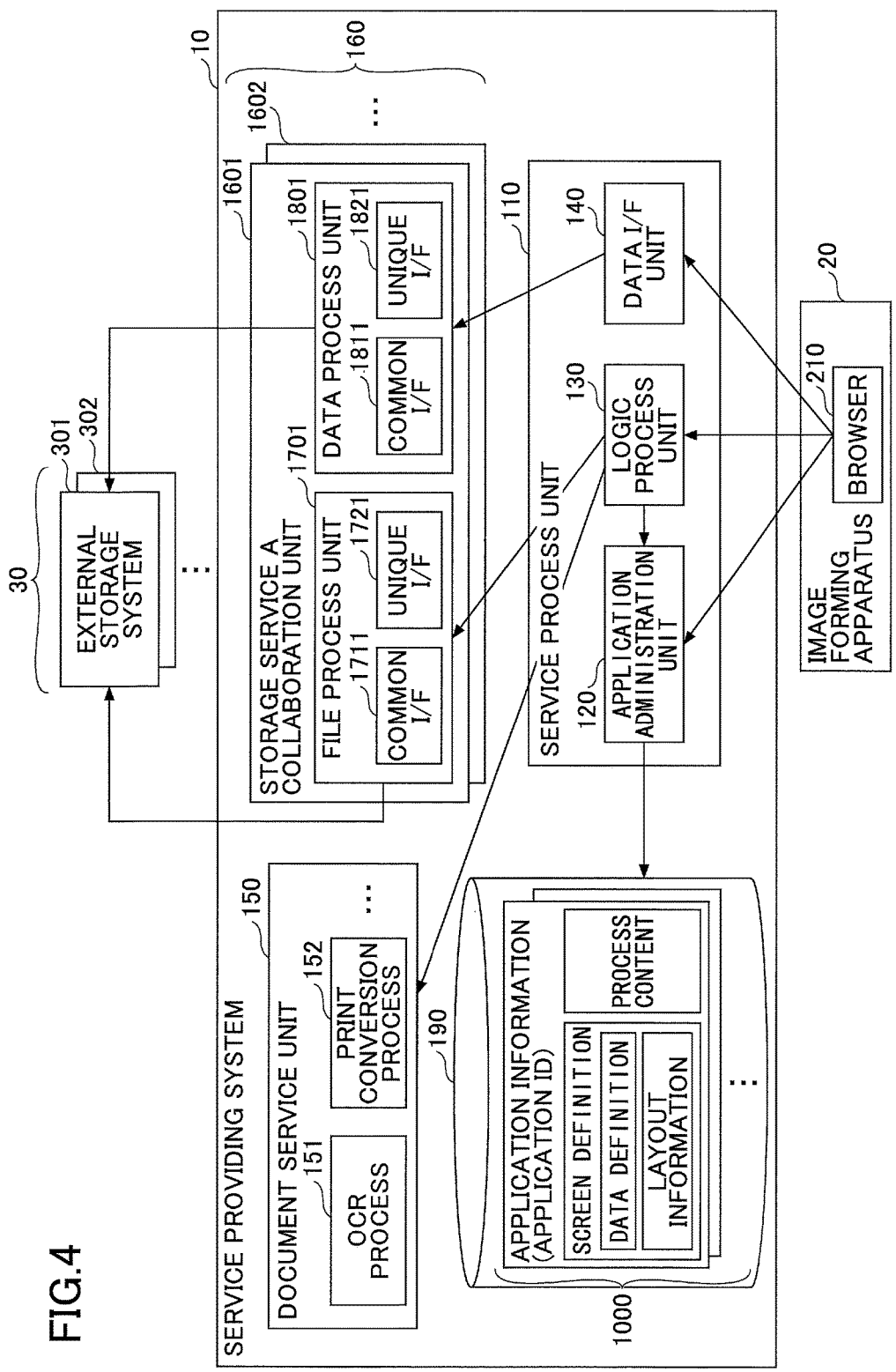
FIG. 4 is an exemplary processing block diagram of the information processing system of the first embodiment.

The information processing system 1 of the first embodiment is substantialized by processing blocks illustrated in, for example, FIG. 4. FIG. 4 is a processing block diagram of an exemplary information processing system of the first embodiment.

The image forming apparatus 20 includes a browser 210 substantialized by, for example, the CPU 211. The user of the image forming apparatus 20 can use a service provided by the service providing system 10 through the browser 210. As such, it is sufficient that the browser 210 is installed in the image forming apparatus 20 of the first embodiment, and it is unnecessary to develop a dedicated application for using the service.

The service providing system 10 includes a service process unit 110, a document service unit 150, and a storage service collaboration unit 160. The service process unit 110, the document service unit 150, and the storage service collaboration unit 160 are substantialized by, for example, the CPU 16.

Further, the service providing system 10 includes an application information memory unit 190. The application information memory unit 190 is substantialized by the HDD 18. Further, the application information memory unit 190 may be substantialized by a memory device connected to the service providing system 10 through the network, for example.

The service process unit 110 includes an application administration unit 120, a logic process unit 130, and a data I/F unit 140.

An application administration unit 120 administers application information 1000 stored in an application information memory unit 190. The application administration unit 120 returns an application screen formed based on a screen definition included in the application information 1000 in response to a request from the browser 210. With this, the application screen for using a service provided by the service providing system 10 is displayed on the browser 210 of the image forming apparatus 20. Although the application information 1000 is described in detail later, the screen definition for causing the above described application on the image forming apparatus 20 and a process content of the service substantialized by the application information 1000 are described in the application information 1000.

Further, the application administration unit 120 returns the process content included in the application information 1000 in response to a request from a logic process unit 130. Although the process content is described in detail later, a series of processes for substantializing a scan delivery service or a cloud print service are described in the process content. The series of processes are also called a "process flow" or a "flow".

The logic process unit 130 acquires the process content from the application administration unit in response to a request received from the browser 210. The logic process unit 130 requests the document service unit 150 and/or the file process unit 170 of the storage service collaboration unit 160 to execute the processes in conformity with the acquired process content. With this, various services of the service providing system 10 are provided to the image forming apparatus 20. Detailed processes conducted in the logic process unit 130 are described in <Detailed Process> described later.

The data I/F unit 140 requests a data process unit 180 of the storage service collaboration unit 160 to acquire, for example, a folder view in response to a request received from the browser 210.

The document service unit 150 is a program (module) group substantializing a service provided by the service providing system 10. The document service unit 150 includes an OCR process 151 of executing an OCR process for an electronic file and a print conversion process 152 of converting the electronic file to a data format (print data), in which the image forming apparatus 20 can print, for example. In addition thereto, the document service unit 150 may include a program executing various processes such as a program for compressing or decompressing the electronic file and a program for converting the data format of an electronic file (e.g., a PDF format).

The storage service collaboration unit 160 requests the external storage system 30 to execute various processes in response to requests received from the logic process unit 130 and the data I/F unit 140. Here, the service providing system 10 includes the storage service collaboration units 160 respectively for the external storage systems 30. Said differently, the service providing system 10 includes a storage service A collaboration unit 1601 for requesting an external storage system 301 to process and a storage service B collaboration unit 1602 for requesting an external storage system 302 to process. Thus, the service providing system 10 includes the storage service collaboration units 160 respectively for the external storage systems 30 which process in collaboration with the storage service collaboration units 160. Hereinafter, when the multiple storage service collaboration units 160 are distinguished, individual units are described as the storage service A collaboration unit 1601 and the storage service B collaboration unit 1602.

As described, the storage service collaboration unit 160 includes the file process unit 170 for receiving the request from the logic process unit 130 and the data process unit 180 for receiving the request from the data I/F unit 140.

The file process unit 170 includes a common I/F 171 and a unique I/F 172, in which an Application Programming Interface (API) for conducting an operation (e.g., an acquisition, a storage, and an edit) to the electronic file stored in the external storage system 30 is defined. The common I/F 171 is an API used among the multiple external storage systems in common as, for example, the API illustrated in FIG. 5A. Said differently, the common I/F 171 of the file process unit 170 is an API group for using a function (e.g., a file acquisition, a file storage, or the like) related to a file operation and can be used by all the external storage systems 30. On the other hand, the unique I/F 172 is an API used by a specific external storage system 30 as, for example, the API illustrated in FIG. 5B. Said differently, the unique I/F 171 of the file process unit 170 is an API group for using a function (e.g., a file edit or the like) related to the file operation and can be used by a specific external storage systems 30. Therefore, the common I/F 171 is defined in a manner similar to all the storage service collaboration units 160. Meanwhile, the unique I/F 172 is defined for a specific storage service collaboration unit 160, in which the API defined by the unique I/F 172 can be used.

On the other hand, the data process unit 180 includes a common I/F 181 and a unique I/F 182, in which an API for acquiring metadata (e.g., an file view, a folder view, or the like) of bibliographic information of the electronic file stored in the external storage system 30 is defined. The common I/F 181 is an API used among the multiple external storage systems in common as, for example, the API illustrated in FIG. 5C. Said differently, the common I/F 181 of the data process unit 180 is an API group for using a function of a metadata acquisition, which can be used by all the external storage systems 30. On the other hand, the unique I/F 182 is an API used by a specific external storage system 30 as, for example, the API illustrated in FIG. 5D. Said differently, the unique I/F 182 of the data process unit 180 is an API group for using a function of a metadata acquisition (e.g., an acquisition of the image file view), which can be used by a specific external storage system 30. Therefore, the common I/F 181 is defined in a manner similar to all the storage service collaboration units 160. Meanwhile, the unique I/F 182 is defined for the specific storage service collaboration unit 160, in which the API defined by the unique I/F 182 can be used.

As described, the service providing system 10 includes the storage service collaboration units 160 respectively for the external storage systems 30 which process in collaboration with the storage service collaboration units 160. Therefore, in a case where the external storage system 30 being a collaboration destination is added, the corresponding storage service collaboration unit 160 may be added to the service providing system 10. Therefore, an influence occurring at a time of adding the external storage system 30 to be the collaboration destination can be localized. Said differently, without influencing another process block (the service process unit 110, the document service unit 150, or the like)(without a need of modifying the other process block) the external storage system 30 to be the collaboration destination can be added. Thus, it is possible to reduce a man-hour necessary for a development of adding the external storage system 30 to be the collaboration destination. Here, a Software Development Kit (SDK) may be used to add the storage service collaboration unit 160.

In the storage service collaboration unit 160, the common I/F 171 and the unique I/F 172 are defined by different modules or the like. The API defined by the common I/F 171 and the unique I/F 172 can be used by designating the "storage service name" (said differently, the "storage service name" is a variable portion). Therefore, if the external storage system 30 of the external storage system 30 is added, it is possible to reuse the common I/F 171 defined in another storage service collaboration unit 160. Said differently, in a case where the external storage system 30 of the collaboration destination is added, it is sufficient to develop only the unique I/F 172 of the external storage system 30 to be added. Thus, it is possible to further reduce a man-hour necessary for a development of adding the external storage system 30 of the collaboration destination. This is similar to the common I/F 181 and the unique I/F 182.

The application information memory unit 190 stores application information 1000. The application information 1000 includes a description of a screen definition for causing the image forming apparatus 20 to display an application screen and a description of a process content indicative of a series of processes for implementing a service. The application information 1000 is stored in the application information memory unit 190 for each application ID uniquely identifying the application information 1000. Within the first embodiment, the application information for implementing a scan delivery service in collaboration with the cloud service A is called "application information 10001", and the application ID of the application information 10001 is called "app001". Within the first embodiment, the application information for implementing a cloud print service in collaboration with the cloud service A is called "application information 10002", and the application ID of the application information 10002 is called "app002".

Here, a data definition included in the screen definition of the application information 10001 and a data definition included in the screen definition of the application information 10002 are illustrated in FIGS. 6A and 6B, respectively. In the data definition, information for forming an entry field (an input box) and a selection field (a selection box) of the application screen, which is displayed on the operation panel 22 or the like by the browser 210 of the image forming apparatus 20, is described. For example, the information for forming the entry field, which is provided to input by the user the file name generated by scanning, is described in a data definition part in FIG. 6A. The information for forming the selection field, which is provided to select a storage destination folder in the storage service A, is described in a data definition part 1102. The Uniform Resource Locator (URL) of the acquisition source of selection elements (here, a folder name and a folder ID of a storage destination candidate) of the selection field is described in "data_source" of the data definition part 1102.

Next, layout information included in the screen definition of the application information 10001 and layout information included in the screen definition of the application information 10002 are illustrated in FIGS. 7A and 7B, respectively. In layout information, information such as a character (a display name of the entry field or the like) displayed on an application screen, which is displayed on the operation panel 22 by the browser 210 of the image forming apparatus 20, and a display position of the entry field or the selection field is described. For example, in the layout definition unit 1301 illustrated in FIG. 7A, information of a display position and a display name of ""data_id":1" (i.e., a data definition unit 1101) in the data definition is described. Although a detailed example is described in detail later, an entry field having a display name of "a file name" is displayed at the first position on the application screen. Further, in the layout definition unit 1302 illustrated in FIG. 7A, information of a display position and a display name of ""data_id":2" (i.e., a data definition unit 1102) in the data definition is described. Although a detailed example is described in detail later, a selection field having a display name of "storage destination folder selection" is displayed at the second position on the application screen.

FIGS. 8A and 8B respectively illustrate a process content of the application information 10001 and a process content of the application information 10002. In the process content, a series of processes of requesting the document service unit 150 and the storage service collaboration unit 160 to implement a service provided by the service providing system 10 is described. For example, a series of processes (i.e., a series of processes of delivering an OCR electronic file to a designated folder in the storage service A after an OCR process provided to the scanned electronic file is performed) for implementing the scan delivery service of the first embodiment is described in the process content illustrated in FIG. 8A. A series of processes (i.e., a series of processes of sending an electronic file acquired from the storage service A to the image forming apparatus 20 after the acquisition) for implementing a cloud print service of the first embodiment is described in the process content illustrated in FIG. 8B. A detailed process content is described later.

As described, the service providing system 10 of the first embodiment provides a service by using application information, in which the screen definition for causing the image forming apparatus 20 to display the application screen and the content of the series of processes is described. Therefore, in a case where a service provided by the service providing system 10 is added, it is sufficient to add the application information 1000 to the application information memory unit 190. Further, it is sufficient to describe the screen definition and the process content in order to add the application information 1000, an easy development is possible. Therefore, a man-hour caused by an addition or a change of a service can be reduced, and the addition or the change of the service by, for example, a third vendor or the like can be easily conducted.

<Detailed Process>

Described next is a detailed process of the information processing system 1 of the first embodiment.

<<Overall Process of Scan Delivery Service>>

Figure 9:
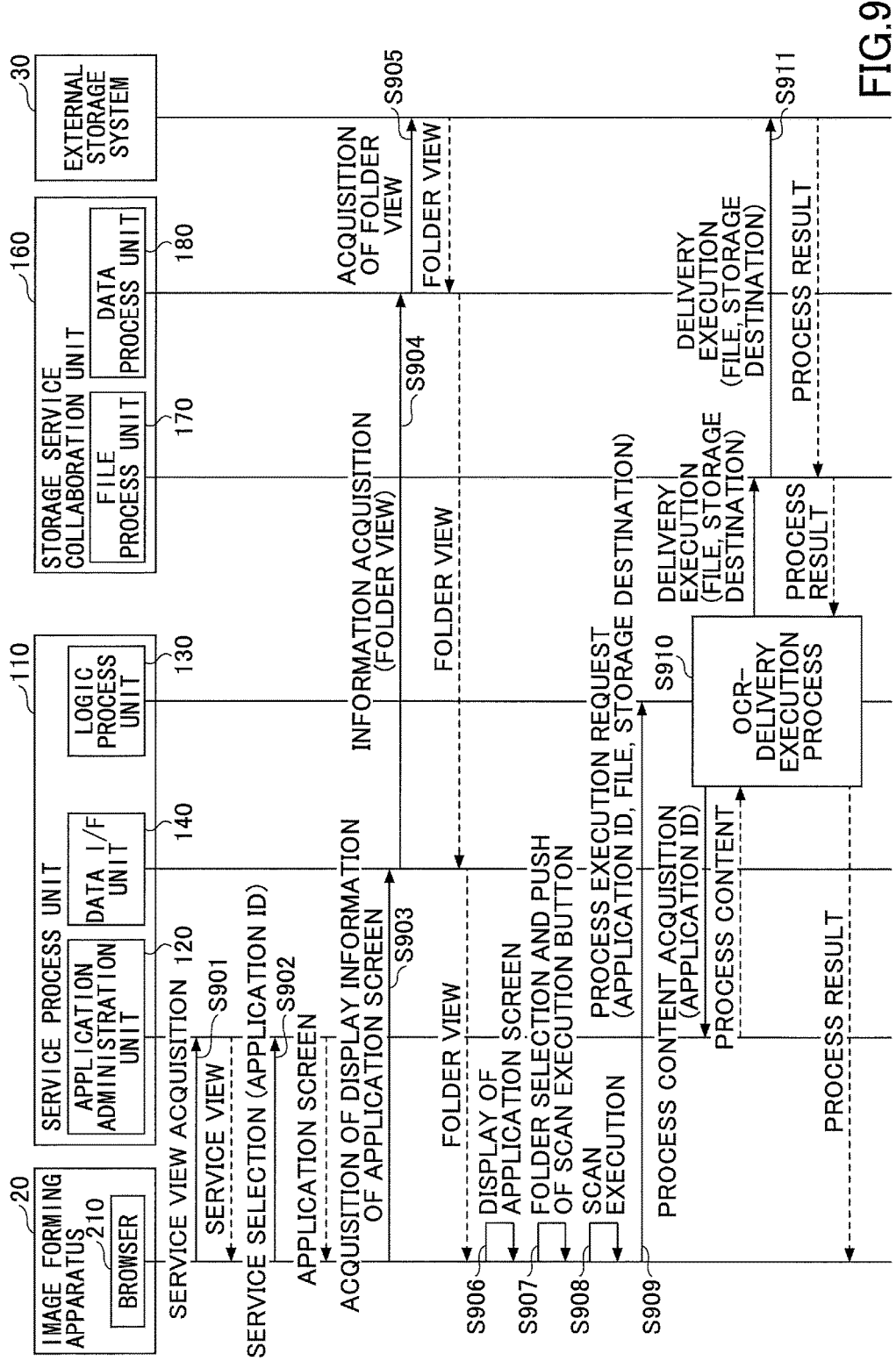
FIG. 9 is a sequence diagram of an exemplary overall process of a scan delivery service of the first embodiment.
Figure 10:
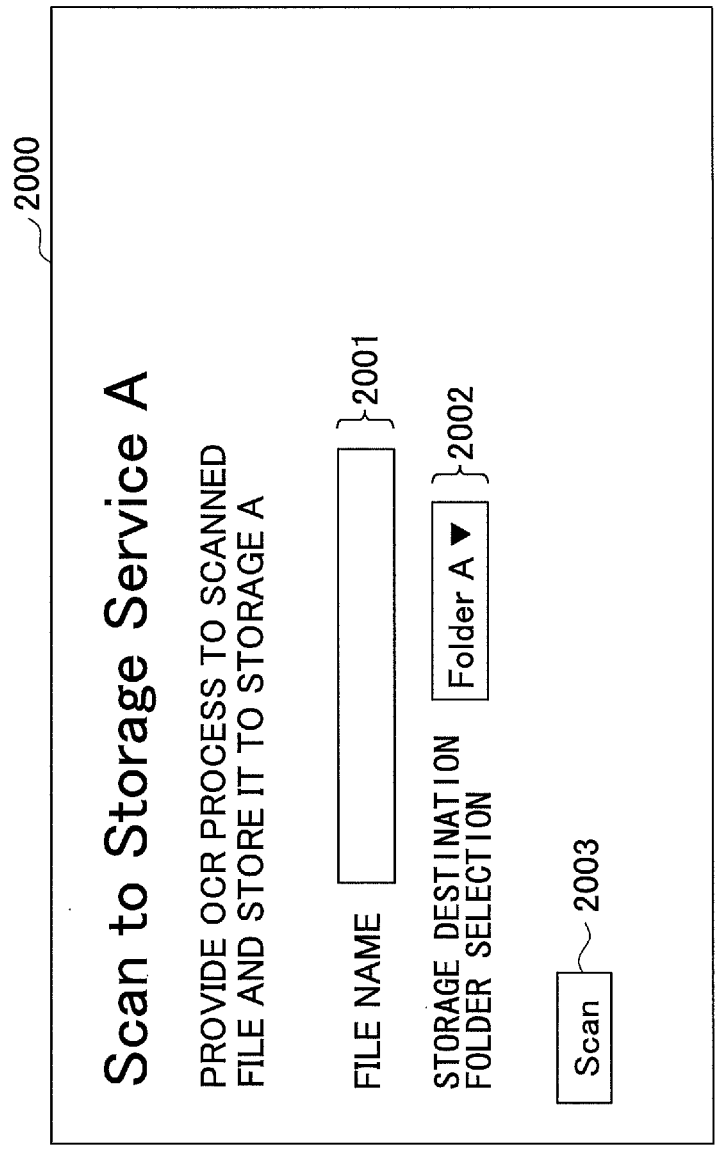
FIGS. 10A and 10B illustrates an exemplary application screen for using a scan delivery service.

At first, an overall process in a case where a user of the image forming apparatus 20 uses the scan delivery service of the first embodiment is described. FIG. 9 is a sequence diagram of an exemplary overall process of the scan delivery service of the first embodiment.

At first, the user of the image forming apparatus 20 conducts an operation of acquiring a service view provided by the service providing system 10 by using the browser 210. The image forming apparatus 20 sends a service view acquisition request of requesting the service process unit 110 of the service providing system 10 to acquire a service view (Step S901). When the application administration unit 120 of the service process unit 110 receives the acquisition request, the application administration unit 120 sends the service view provided by the service providing system 10 to the image forming apparatus 20. With this, the browser 210 of the image forming apparatus 20 displays the service view provided by the service providing system 10 on the operation panel 22 of the image forming apparatus 20. The service view includes the service name of the service provided by the service providing system 10 and the application ID of the application information 1000 for implementing the service.

The user selects a service desired to be used by the user from the service view displayed on the operation panel of the image forming apparatus 20. Then the browser 210 sends an application ID of application information 1000 for implementing the selected service to the application administration unit 120 (step S902). Here, the user selects a use of a service name of "scan delivery service". Therefore, the browser 210 sends the application ID "app001" of the application information 10001 to the application administration unit 120.

Then, the application administration unit 120 generates the application screen in the HyperText Markup Language (HTML) format based on the screen definition included in the application information 10001 having the application ID "app001" received from the browser 210 and sends the generated application screen to the browser 210.

When the browser 210 receives the application screen from the application administration unit 120, the browser 210 requests the data I/F unit 140 to acquire display information (step S903). Here, the display information is selection elements in the selection field of the application screen, for example. Said differently, within the first embodiment, the browser 210 requests the data I/F unit 140 to acquire a folder view of the storage service A, which is a delivery destination (a storage destination) of the scan delivery. This request can be effected by sending an HTTP request to "http://sample.xxx.co.jp/service-a/data/folders", which is defined in "data_source" described in the data definition unit 1102 illustrated in FIG. 6A. In this URL, a part of "http://sample.xxx.co.jp" designate the host name of the service providing system 10, and a part of "/service-a/data/folders" designates the API "said differently, the API illustrated in FIGS. 5A to 5D) in the storage service collaboration unit 160.

Next, when the data I/F unit 140 receives an acquisition request of requesting to acquire the display information from the browser 210, the data I/F unit 140 sends the acquisition request to the data process unit 180 of the storage service collaboration unit 160 (step S904). Within the first embodiment, the data I/F unit 140 sends the acquisition request to the data process unit 1801 of the storage service A collaboration unit 1601 based on "service-a" (the storage service name) included in the URL.

When the data process unit 180 receives the request from the data I/F unit 140, the data process unit 180 sends a corresponding process request to the external storage system 30 based on the URL included in the request (step S905). Said differently, the data process unit 180 requests the corresponding external storage system 30 to process using the API defined in the common I/F 181 or the unique I/F based on the URL included in a request received from the data I/F unit 140. Within the first embodiment, the data process unit 180 requires the storage service A to acquire the folder view using the API defined in the common I/F 181 based on "/service-a/data/folders" included in the above URL. Then, the browser 210 receives the folder view through the storage service A collaboration unit 1601. The folder view is information of the folder name and the folder ID of the storage service A, which is a candidate of the storage destination of the electronic file, in the scan delivery service of the first embodiment.

Next, the browser 210 causes the application screen 2000 illustrated in, for example, FIG. 10A to be displayed on the operation panel 22 based on the application screen and the folder view, which are received from the application administration unit in step S902 (step S906).

Here, the application screen 2000 for using the scan delivery service illustrated in FIG. 10A includes a file name entry field 2001, a storage destination folder selection field 2002, and a scan execution button 2003. Among these, the file name entry field 2001 and the storage destination folder selection field 2002 are respectively described by HTML source codes 2101 and 2102 as illustrated in FIG. 10B. These HTML source codes 2101 and 2102 are generated by the application administration unit 120 based on the data definition units 1101 and 1102 illustrated in FIG. 6A and the layout definition units 1301 and 1302 illustrated in FIG. 7B. However, a setup value of "option" designated in an HTML source code 2102 is set by the browser 210 based on the folder view acquired from the external storage system 30. As described above, the application screen 2000 is generated by setting the information of the folder view acquired from the external storage system 301 to the HTML generated by the application administration unit 120 based on the screen definition of the application information 10001.

Next, the user inputs a desired file name into the file name entry field 2001 on the application screen 2000 illustrated in FIG. 10A and selects a desired storage destination folder from the storage destination folder selection field 2002 on the application screen 2000 illustrated in FIG. 10A. Then, the user sets an original manuscript onto the scanner 26 of the image forming apparatus 20, and pushed a scan execution button 2003 (step S907). Here, the user inputs a file name of "test" into the file name entry field 2001, selects "FolderB" from the storage destination folder selection field 2002, and pushes the scan execution button 2003. With this, the original manuscript is read by the scanner 26 of the image forming apparatus 20, and an electronic file having a file name of "test" is generated (step S908).

Then, the browser 210 sends an execution request of requesting to process the scan delivery service to the logic process unit 130 (step S909). Here, the execution request includes the application ID of "app001", the electronic file generated by step S908 above, and a folder ID of "folder_id_b" of the selected storage destination folder "FolderB".

When the logic process unit 130 receives the execution request of the process, the logic process unit 130 acquires the process content from the application information 1000 of the application ID included in the execution request of the process through the application administration unit 120, and executes the process in conformity with the process content (step S910). Said differently, in the scan delivery service of the first embodiment, after an OCR process is provided for the electronic file included in the execution request for the process, the electronic file provided with the OCR process is delivered (uploaded) to the folder "FolderB" of the storage service A. A detailed process of the process of step S910 is described later. Here, the description continues on the premise that the logic process unit 130 sends a request for a delivery execution including the electronic file provided with the OCR process and the folder ID "folder_id_b" of the folder "FolderB" to the file process unit 1701 of the storage service A collaboration unit 1601.

When the file process unit 170 receives a request for the delivery execution from the logic process unit 130, the file process unit 170 uses the API defined in the common I/F 171 or the unique I/F 172 to request the corresponding external storage system 30 to process (step S911). Specifically, within the first embodiment, the electronic file is delivered (uploaded) to the folder "FolderB" using the API "/service-a/process/folder" for storing a file into the storage service A, which is defined in the common I/F 1711 of the file process unit 1701. Then, after the electronic file is completely uploaded, the process result is displayed in the browser 210. Thus, the scan delivery service of the first embodiment is completed.

<<Processes from OCR to Delivery Execution>>

Figure 11:
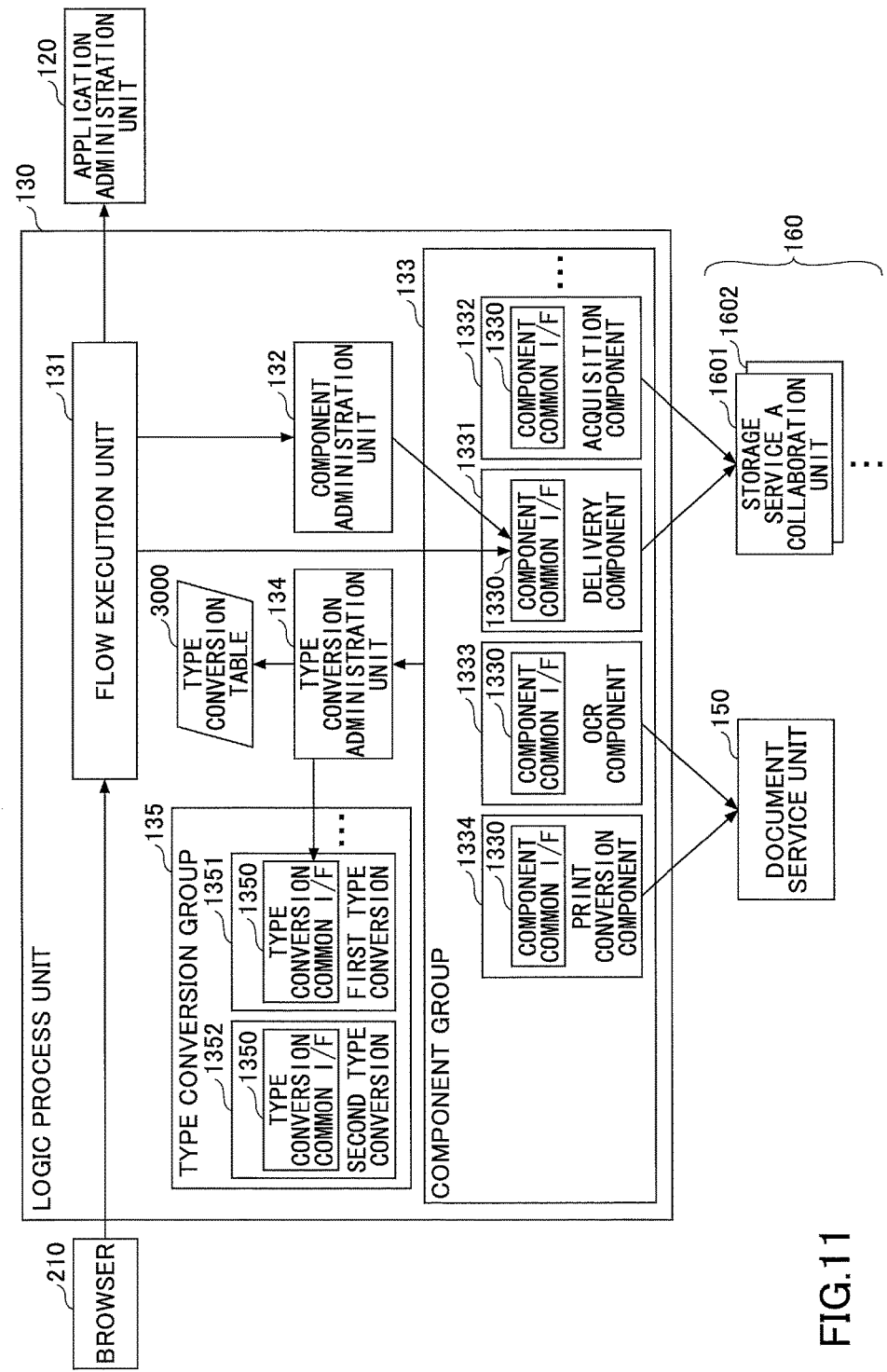
FIG. 11 is a processing block diagram of an exemplary logic process unit of the first embodiment.

Described next is a detailed process of step S910 illustrated in FIG. 9. This process is mainly executed by the logic process unit 130. Therefore, before describing the detailed process of step S910 illustrated in FIG. 9, a detailed process block of the logic process unit 130 is described. FIG. 11 is a processing block diagram of an exemplary logic process unit of the first embodiment. The logic process unit 130 includes the flow execution unit 131, the component administration unit 132, the component group 133, the type conversion administration unit 134, and the type conversion group 135. Further, the logic process unit 130 uses the type conversion table 3000.

When the flow execution unit 131 receives the execution request for the process of the scan delivery service from the browser 210, the flow execution unit 131 acquires the process content from the application information 1000 through the application administration unit 120. Then, the flow execution unit 131 requests a component to execute the process in conformity with the acquired process content. Here, the component is a program (a module) of executing various processes, and is defined by, for example, a class, a mathematical function, or the like.

The component administration unit 132 generates the component in response to the request from the flow execution unit 131. Here, the generation of the component means that the component defined by, for example, the class is deployed on the memory (for example, the RAM 14).

The component group 133 is a set of components. The component group 133 includes a delivery component 1331 for delivering the electronic file to the external storage system 30, and an acquisition component 1332 for acquiring the electronic file from the external storage system 30. Further, component group 133 includes an OCR component for providing an OCR process to the electronic file, and a print conversion component 1334 for converting the electronic file to print data.

Further, these components include a component common I/F 1330. The component common I/F 1330 is an API defined for each component in common, and includes an API for generating the component and an API for requesting the component to execute the process. As described, it is possible to localize an influence caused by the addition of the component when each component has the component common I/F 1330. Said differently, the component can be added without influencing the flow execution unit 131 and the component administration unit 132. With this, the man-hour necessary for the development of the addition of the component can be reduced.

The type conversion administration unit 134 administers a type conversion of the data type. A data type which can be handled by each component is previously determined. Therefore, the type conversion administration unit 134 generates a type conversion defined in the type conversion group 135 by referring to the type conversion table 3000 illustrated in FIG. 12 in response to a request from the component. The type conversion administration unit 134 requests to execute a type conversion process for the generated type conversion. Here, the type conversion is a program (a module) for executing a type conversion process of the data type, and is defined by, for example, a class, a mathematical function, or a like.

Here, the generation of the type conversion means that the type conversion defined by, for example, the class is deployed on the memory (for example, the RAM 14). The data type includes "InputStream" indicative of stream data, "LocalFilePath" indicative of a path (an address) of the electronic file stored in the memory device or the like, and "File" indicative of an entity of the electronic file.

The type conversion group 135 is a set of the type conversion. The type conversion group 135 includes a first type conversion 1351 converting the data type "InputStream" to "LocalFilePath" and a second type conversion 1352 converting "LocalFilePath" to "File".

Further, these type conversions include a type conversion common I/F 1350. The type conversion common I/F 1350 is an API defined for each type conversion in common, and includes an API for generating the type conversion and an API for requesting the type conversion to execute the process. As described, it is possible to localize an influence caused by the addition of the type conversion when each type conversion has the type conversion common I/F 1350. Said differently, it is possible to add the type conversion without influencing the type conversion administration unit 134. With this, the man-hour necessary for the development of the addition of the type conversion can be reduced.

Described next is a detailed process of step S910 illustrated in FIG. 9. FIG. 13 is a sequence chart of an exemplary process from an OCR to a delivery execution of the first embodiment.

At first, the flow execution unit 131 receives an execution request of requesting to process the scan delivery service from the browser 210 (step S1301). Here, this execution request includes the application ID of "app001", the electronic file generated by step S908 above, and a folder ID (the storage destination) of the selected storage destination folder "FolderB". Here, the electronic file is transferred from the browser 210 as having a data type of "InputStream" (i.e., stream data).

When the flow execution unit 131 receives the execution request, the flow execution unit 131 requests the application administration unit 120 to acquire the process content (step S1302). Here, this acquisition request of requesting to acquire the process content includes the application ID of "app001". The flow execution unit 131 acquires the process content included in the application information 10001 corresponding to the application ID of "app001" from the application administration unit 120. Said differently, the flow execution unit 131 acquires the process content illustrated in FIG. 8A.

The flow execution unit 131 requests the component administration unit 132 to acquire the component in conformity with the acquired process content (step S1303). More specifically, the flow execution unit 131 requests the component administration unit 132 to acquire the OCR component 1333 based on ".to("process:ocr")" designated next to "From("file:input")" of the process content illustrated in FIG. 8A.

When the component administration unit 132 receives the acquisition request to acquire the OCR component 1333, the component administration unit 132 generates the OCR component 1333 (step S1304). The OCR component 1333 is generated by using the API for generating the component defined by the component common I/F 1330. When the OCR component 1333 is generated, the component administration unit 132 returns an OCR component 1333 to the flow execution unit 131. For example, the component administration unit 132 returns the address in the memory (e.g., the RAM 14), on which the OCR component 1333 is deployed, to the flow execution unit 131.

The flow execution unit 131 requests the generated OCR component 1333 to execute the process while designating the data (step S1305). The data type of the designated data is "InputStream". The designated data is an electronic file transferred from the browser 210. Said differently, the flow execution unit 131 requests to execute the process by transferring the electronic file, which is transferred as the data type of "InputStream" from the browser 210, simply as "data" (without convincing the data type) to the OCR component 1333. Referring to FIG. 13, this electronic file transferred without convincing the data type is simply indicated as the "data".

The OCR component 1333 requests the type conversion administration unit 134 to perform a type conversion (step S1306). Here, the type conversion request includes the data and a designation of "LocalFilePath" indicative of a data type, which can be treated by the OCR component 1333.

The type conversion administration unit 134 checks whether the data type of the data included in the received type conversion request matches the designated data type (step S1307). Here, because the data type of the data included in the received type conversion request is "InputStream" and the designated data type is "LocalFilePath", it is determined that the data type of the data included in the received type conversion request does not match the designated data type.

Then, the type conversion administration unit 134 specifies a type conversion for converting "InputStream" to "LocalFilePath" (here, the first type conversion 1351 is specified) by referring to the type conversion table 3000, and generates the specified type conversion (step S1308).

Then, the type conversion administration unit 134 requests the generated first type conversion 1351 to perform the type conversion process while designating the data (step S1309). Then, the first type conversion 1351 coverts the data type of the designated data from "InputStream" to "LocalFilePath" (step S1310), and returns the converted data to the type conversion administration unit 134. Thereafter, the type conversion administration unit 134 sends the data provided with the data conversion to the OCR component 1333 (step S1311).

When the OCR component 1333 receives the data provided with the type conversion, the OCR component 1333 executes the process (step S1312). Said differently, the OCR process is executed for the electronic file indicated by the data (i.e., a path or an address) of the data type of "LocalFilePath". More specifically, the OCR component 1333 requests the OCR process 151 of the document service unit 150 to process, and the OCR process 151 executes the process to the electronic file. Then, the OCR component 1333 returns the data to the flow execution unit 131. Here, the returned data is the path or the address indicative of the electronic file provided with the OCR process (said differently, the data type of the returned data is "LocalFilePath").

Next, the flow execution unit 131 requests the component administration unit 132 to acquire the component in conformity with the acquired process content (step S1313). More specifically, the flow execution unit 131 requests the component administration unit 132 to acquire the delivery component 1331 based on ".to("storage: send_to_folder?type=service-a")" designated next to ".to ("process:ocr")" of the process content illustrated in FIG. 8A. Here, a portion of "?type=service-a" of the designated process content is an option parameter, which indicates that the storage service of the upload destination of the data in the process of the delivery component 1331 is the "storage service A". Further, it is possible to add the storage destination (the folder IF of the storage destination folder) included in the execution request of step S1301 to the above designated process content so as to read ".to("storage: send_to_folder? type=service-a&targetfolder=folder_id_b")". In a manner similar thereto, the file name may be further added as an option parameter to be ".to("storage: send_to_folder? type=service-a&targetfolder=folder_id_b&filename=test.pdf")".

When the component administration unit 132 receives the acquisition request to acquire the delivery component 1331, the component administration unit 132 generates the delivery component 1331 (step S1314). The delivery component 1331 is generated by using the API for generating the component defined by the component common I/F 1330. When the delivery component 1331 is generated, the component administration unit 132 returns the delivery component 1331 to the flow execution unit 131. For example, the component administration unit 132 returns the address in the memory (e.g., the RAM 14), on which the delivery component 1331 is deployed, to the flow execution unit 131.

The flow execution unit 131 requests the generated OCR component 1331 to execute the process while designating the data (step S1315). Here, the data type of the designated data is "LocalFilePath".

The delivery component 1331 requests the type conversion administration unit 134 to perform a type conversion (step S1316). Here, the type conversion request includes the data and a designation of "LocalFilePath" indicative of a data type, which can be treated by the delivery component 1331.

The type conversion administration unit 134 checks whether the data type of the data included in the received type conversion request matches the designated data type (step S1317). Here, because the data type of the data included in the received type conversion request is "LocalFilePath" and the designated data type is "LocalFilePath", it is determined that the data type of the data included in the received type conversion request matches the designated data type. Then, the type conversion administration unit 134 sends the data included in the type conversion request directly to the delivery component 1331 (step S1318). As described, when the data type of the data included in the received type conversion request matches the designated data type (the process of step S1317), the type conversion administration unit 134 does not generate the type conversion.

When the delivery component 1331 receives the data from the type conversion administration unit 134, the delivery component 1331 executes the process (step S1319). Said differently, within the first embodiment, the delivery component 1331 requests the file process unit 1701 of the storage service A collaboration unit 1601 to perform a delivery execution of the data using the API for the file storage defined as the common I/F 1711. Said differently, within the first embodiment, the delivery component 1331 requests the file process unit 1701 of the storage service A collaboration unit 1601 to perform a delivery execution of the data using the API for the file storage defined as the common I/F 1711. With this, the electronic file (the electronic file generated by scanning is provided with the OCR process) having a file name of "test" is stored in the folder "FolderB" of the storage service A. The process result is sent to the browser 210 through the flow execution unit 131.

<<Overall Process of Cloud Print Service>>

Next, an overall process in a case where a user of the image forming apparatus 20 uses the cloud print service of the first embodiment is described. FIG. 14 is a sequence chart of an exemplary overall process of the cloud print service of the first embodiment.

At first, the user of the image forming apparatus 20 conducts an operation of acquiring a service view provided by the service providing system 10 by using the browser 210. The image forming apparatus 20 sends a service view acquisition request of requesting the service process unit 110 of the service providing system 10 to acquire the service view (Step S1401). When the application administration unit 120 of the service process unit 110 receives the acquisition request, the application administration unit 120 sends a service view provided by the service providing system 10 to the image forming apparatus 20.

The user selects a service desired to be used by the user from the service view displayed on the operation panel of the image forming apparatus 20. Then the browser 210 sends an application ID of application information 1000 for implementing the selected service to the application administration unit 120 (step S1402). Here, the user selects a use of a service name of "cloud print service". Therefore, the browser 210 sends the application ID "app002" of the application information 10002 to the application administration unit 120.

Then, the application administration unit 120 generates the application screen in the HyperText Markup Language (HTML) format based on the screen definition included in the application information 10002 having the application ID "app002" received from the browser 210 and sends the generated application screen to the browser 210.

When the browser 210 receives the application screen from the application administration unit 120, the browser 210 requests the data I/F unit 140 to acquire display information (step S1403). Within the first embodiment, the browser 210 requests the data I/F unit 140 to acquire a view of the electronic file of the storage service A as a candidate of a print target using the cloud print service. This request can be effected by sending an HTTP request to "http://sample.xxx.co.jp/service-a/data/files", which is defined in "data_source" described in the data definition unit 1201 illustrated in FIG. 6B.

Next, when the data I/F unit 140 receives an acquisition request of requesting to acquire the display information from the browser 210, the data I/F unit 140 sends the acquisition request to the data process unit 180 of the storage service collaboration unit 160 (step S1404).

When the data process unit 180 receives the request from the data I/F unit 140, the data process unit 180 sends a corresponding process request to the external storage system 30 based on the URL included in the request (step S1405). Within the first embodiment, the data process unit 180 requests the storage service A to acquire the file view based on "/service-a/data/files" included in the above URL. Then, the browser 210 receives the file view through the storage service A collaboration unit 1601. The file view is information of the file name, the file ID, and so on of the electronic file stored in the storage service to be the candidate of the print target in the cloud print service of the first embodiment.

Next, the browser 210 causes the application screen 4000 illustrated in, for example, FIG. 15A to be displayed on the operation panel 22 based on the application screen and the file view, which are received from the application administration unit in step S1402 (step S1406).

Here, the application screen 4000 for using the cloud print service illustrated in FIG. 15A includes a selection field 4001 for selecting the print target and a print execution button 4002. Between these, the file selection field 4001 is described using a HTML source code 4101 as illustrated FIG. 15B. Such the HTML source code 4101 is generated by the この application administration unit 120 based on the data definition unit 1201 illustrated in FIG. 6B and the layout definition unit 1401 illustrated in FIG. 7B. However, a setup value of "option" designated in an HTML source code 4101 is set by the browser 210 based on the file view acquired from the external storage system 30.

Next, the user selects a desired file from the file selection field 4001 on the application screen 4000 illustrated in FIG. 15A and pushed a print execution button 4002 (step S1407). Here, the user selects "FileA" from the file selection field 4001 and pushes the print execution button 4002.

Then, the browser 210 sends an execution request of requesting to process the cloud print service to the logic process unit 130 (step S1408). Here, the execution request includes the application ID "app002" and the file ID "file_id_a" of the file "FileA" selected from the file selection field 4001.

When the logic process unit 130 receives the execution request of the process, the logic process unit 130 acquires the process content from the application information 1000 of the application ID included in the execution request of the process through the application administration unit 120, and executes the process in conformity with the process content (step S1409). Said differently, in the cloud print service of the first embodiment, after acquiring (downloading) the electronic file as a print object from the storage service A, the electronic file is converted (is subjected to a print conversion) to print data enabled to be printed by the image forming apparatus 20. A detailed process of the process of step S1409 is described later. Here, the description continues on the premise that the logic process unit 130 sends a request for a file acquisition execution including the file ID "file_id_a" of the file "FileA" to the file process unit 1701 of the storage service A collaboration unit 1601.

When the file process unit 170 receives a request for the file acquisition from the logic process unit 130, the file process unit 170 uses the API defined in the common I/F 171 or the unique I/F 172 to request the corresponding external storage system 30 to process (step S1410). Specifically, within the first embodiment, the file "FileA" is acquired (uploaded) using the API "/service-a/process/file" for acquiring a file into the storage service A, which is defined in the common I/F 1711 of the file process unit 1701. Then, after the logic process unit 130 converts the acquired file "FileA" to print data having a data format printable by the image forming apparatus 20, the logic process unit 130 sends the converted print data to the image forming apparatus 20.

When the printer 25 of the image forming apparatus 20 receives the print data from the logic process unit 130, the image forming apparatus 20 prints the print data (step S1411). With this, the cloud print service of the first embodiment is completed.

<<Process from File Acquisition Execution to Print Conversion>>

Figure 16:
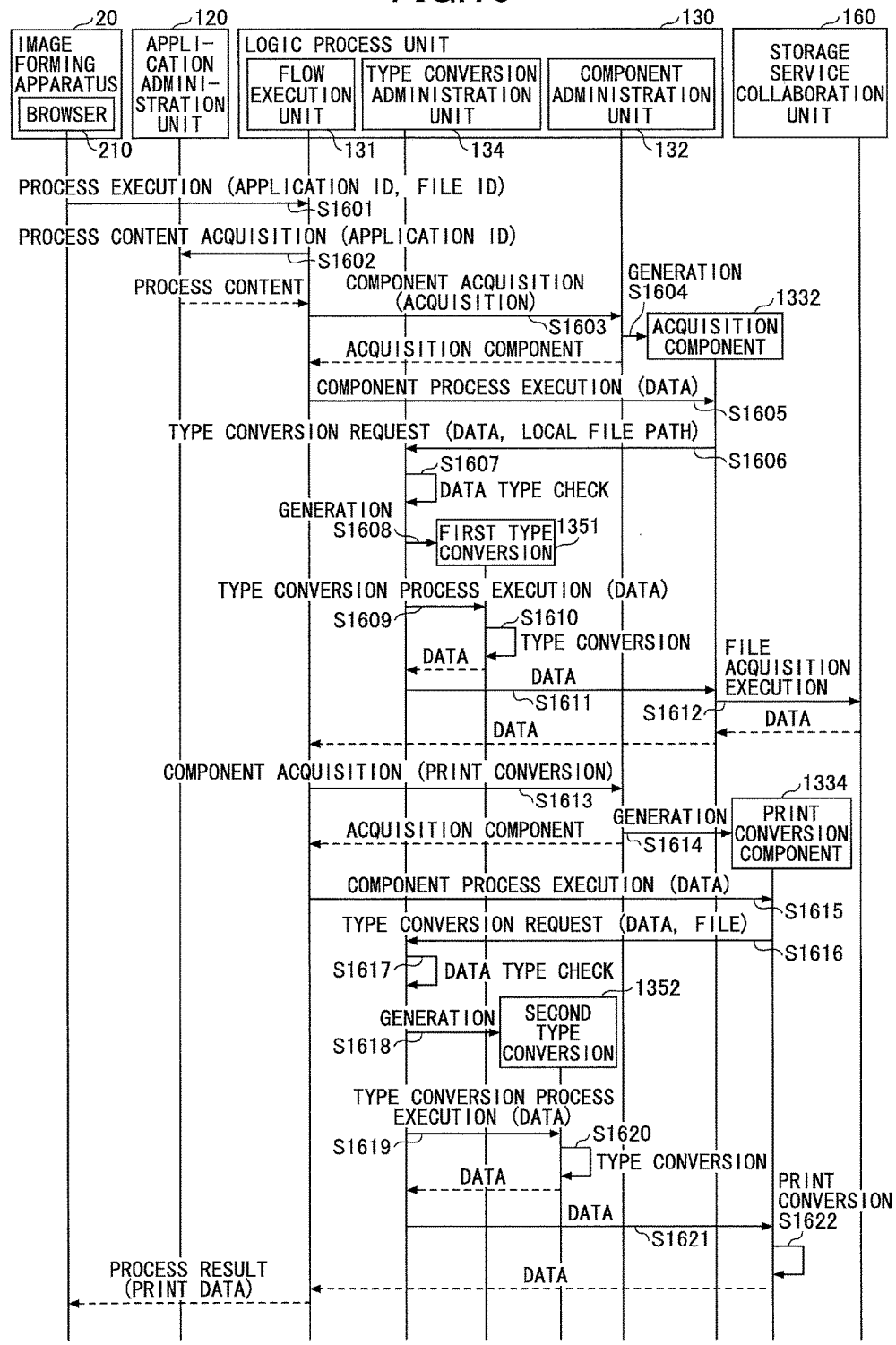
FIG. 16 is a sequence chart of an exemplary process from a file acquisition execution to a print conversion of the first embodiment.

Described next is a detailed process of step S1409 illustrated in FIG. 14. FIG. 16 is a sequence chart of an exemplary process from a file acquisition execution to a print conversion of the first embodiment.

At first, the flow execution unit 131 receives an execution request of requesting to process the cloud print service from the browser 210 (step S1601). Here, the execution request includes the application ID "app002" and the file ID "file_id_a" of the file of the selected print target. Here, the file ID has the data type "InputStream" (said differently, the stream data) and is transferred from the browser 210.

When the flow execution unit 131 receives the execution request, the flow execution unit 131 requests the application administration unit 120 to acquire the process content (step S1602). Here, this acquisition request of requesting to acquire the process content includes the application ID of "app002". The flow execution unit 131 acquires the process content included in the application information 10002 corresponding to the application ID "app002" from the application administration unit 120. Said differently, the flow execution unit 131 acquires the process content illustrated in FIG. 83.

The flow execution unit 131 requests the component administration unit 132 to acquire the component in conformity with the acquired process content (step S1603). More specifically, the flow execution unit 131 requests the component administration unit 132 to acquire the acquisition component 1332 based on ".to("storage: receive_file?type=service-a")" designated next to "From ("file:input")" of the process content illustrated in FIG. 8B. Here, a portion of "?type=service-a" of the designated process content is an option parameter, which indicates that the storage service of the acquisition (download) destination of the electronic file in the process of the acquisition component 1332 is the "storage service A". Further, it is possible to add the file ID of the file "FileA" of a print target included in the execution request of step S1601 to the above designated process content so as to read ".to("storage:receive_file?type=service-a&targetfile=file_id_a"))".

When the component administration unit 132 receives the acquisition request to acquire the acquisition component 1332, the component administration unit 132 generates the acquisition component 1332 (step S1604). The acquisition component 1332 is generated by using the API for generating the component defined by the component common I/F 1330. When the acquisition component 1332 is generated, the component administration unit 132 returns the acquisition component 1332 to the flow execution unit 131. For example, the component administration unit 132 returns the address in the memory (e.g., the RAM 14), on which the OCR component 1333 is deployed, to the flow execution unit 131.

The flow execution unit 131 requests the generated acquisition component 1332 to execute the process while designating the data (step S1605). The data type of the designated data is "InputStream". The designated data is the file ID of the print target file transferred from the browser 210. Said differently, the flow execution unit 131 requests to execute the process by transferring the file ID, which is transferred as the data type of "InputStream" from the browser 210, simply as "data" (without convincing the data type) to the acquisition component 1332. Referring to FIG. 16, this file ID or this electronic file transferred without convincing the data type is simply indicated as the "data".

The acquisition component 1332 requests the type conversion administration unit 134 to perform a type conversion (step S1606). Here, the type conversion request includes the data and a designation of "LocalFilePath" indicative of a data type, which can be treated by the acquisition component 1332.

The type conversion administration unit 134 checks whether the data type of the data included in the received type conversion request matches the designated data type (step S1607). Here, because the data type of the data included in the received type conversion request is "InputStream" and the designated data type is "LocalFilePath", it is determined that the data type of the data included in the received type conversion request does not match the designated data type.

Then, the type conversion administration unit 134 specifies a type conversion for converting "InputStream" to "LocalFilePath" (here, the first type conversion 1351 is specified) by referring to the type conversion table 3000, and generates the specified type conversion (step S1608).

Then, the type conversion administration unit 134 requests the generated first type conversion 1351 to perform the type conversion process while designating the data (step S1609). Then, the first type conversion 1351 coverts the data type of the designated data from "InputStream" to "LocalFilePath" (step S1610), and returns the converted data to the type conversion administration unit 134. Thereafter, the type conversion administration unit 134 sends the data provided with the data conversion to the acquisition component 1332 (step S1611).

When the acquisition component 1332 receives the data provided with the type conversion, the acquisition component 1332 executes the process (step S1612). Said differently, within the first embodiment, the acquisition component 1332 requests the file process unit 1701 of the storage service A collaboration unit 1601 to execute a file acquisition using the API for the file acquisition defined as the common I/F 1711. Specifically, the acquisition component 1332 requests the file process unit 1701 of the storage service A collaboration unit 1601 to execute the file acquisition using "service-a/process/file" as the API as illustrated in FIG. 5A. With this, the electronic file having the file ID "file_id_a" is acquired (downloaded) from the storage service A. The electronic file acquired by the acquisition component 1332 is sent to the flow execution unit 131 as data.

Next, the flow execution unit 131 requests the component administration unit 132 to acquire the component in conformity with the acquired process content (step S1613). Said differently, the flow execution unit 131 requests the component administration unit 132 to acquire the print conversion component 133 based on ".to("process:conv")" designated next to ".to("storage:receive_file? type=service-a")" being the process content illustrated in FIG. 8B.

When the component administration unit 132 receives the acquisition request to acquire the print conversion component 1334, the component administration unit 132 generates the print conversion component 1334 (step S1614). The print conversion component 1334 is generated by using the API for generating a component defined in the component common I/F 1330. When the print conversion component 1334 is generated, the component administration unit 132 returns the print conversion component 1334 to the flow execution unit 131. For example, the component administration unit 132 returns the address in the memory (e.g., the RAM 14), on which the print conversion component 1334 is deployed, to the flow execution unit 131.

The flow execution unit 131 requests the generated print conversion component 1334 to execute the process while designating the data (step S1615). Here, the data type of the designated data is "LocalFilePath".

The print conversion component 1334 requests the type conversion administration unit 134 to perform a type conversion (step S1616). Here, the type conversion request includes the data and a designation of "File" indicative of a data type, which can be treated by the print conversion component 1334.

The type conversion administration unit 134 checks whether the data type of the data included in the received type conversion request matches the designated data type (step S1617). Here, because the data type of the data included in the received type conversion request is "LocalFilePath" and the designated data type is "File", it is determined that the data type of the data included in the received type conversion request does not match the designated data type.

Then, the type conversion administration unit 134 specifies a type conversion for converting "LocalFilePath" to "File" (here, the second type conversion 1352 is specified) by referring to the type conversion table 3000, and generates the specified type conversion (step S1618).

Then, the type conversion administration unit 134 requests the generated second type conversion 1352 to perform the type conversion process while designating the data (step S1619). Then, the second type conversion 1352 coverts the data type of the designated data from "LocalFilePath" to "File" (step S1620), and returns the converted data to the type conversion administration unit 134. Thereafter, the type conversion administration unit 134 sends the data provided with the data conversion to the print conversion component 1334 (step S1621).

When the print conversion component 1334 receives the data provided with the type conversion, the print conversion component 1332 executes the process (step S1622). Said differently, a process of converting the data (i.e., the electronic file) of the data type "File" is converted print data being a data format printable by the image forming apparatus 20 is executed. More specifically, the print conversion component 1334 requests the print conversion process 152 of the document service unit 150 to process, and the print conversion process 152 executes the process to the data (the electronic file). The print conversion component 1334 returns the print data to the image forming apparatus 20 through the flow execution unit 131.

Second Embodiment

Next, the information processing system 1 of a second embodiment is described. The service providing system 10 included in the information processing system 1 of the second embodiment differs from that in the first embodiment in that a request from the image forming apparatus 20, in which the browser 210 is not installed, is received. Hereinafter, portions having substantially the same functions as those of the first embodiment and portions performing substantially the same processes as those of the first embodiment are designated by the same reference symbols as those of the first embodiment, and description of these portions is omitted.

<Software Structure>

Figure 17:
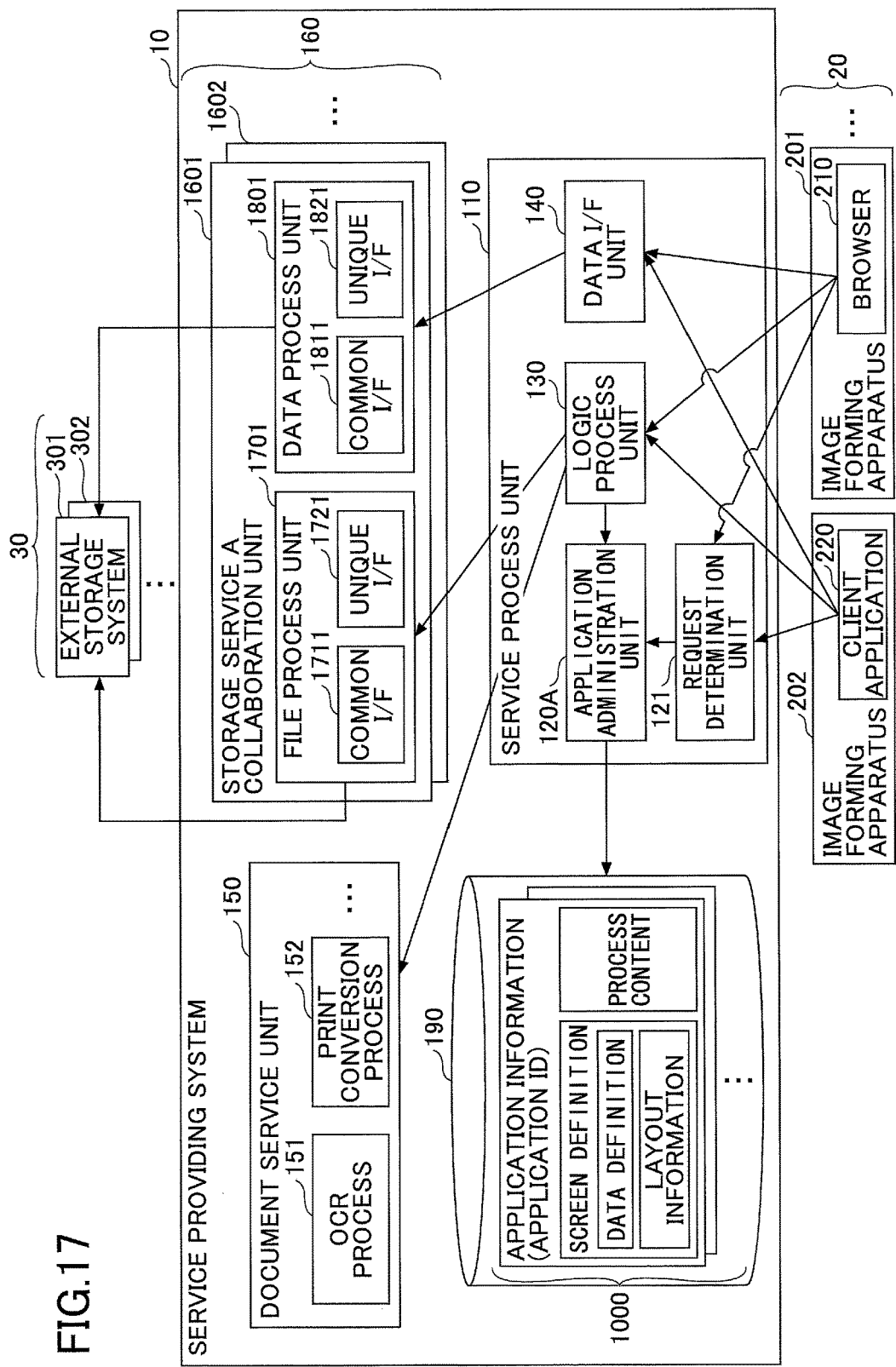
FIG. 17 is a processing block diagram of an exemplary information processing system of a second embodiment.

The information processing system 1 of the second embodiment is substantialized by processing blocks illustrated in, for example, FIG. 17. FIG. 17 is a processing block diagram of an exemplary information processing system of the second embodiment.

The image forming apparatus 20 includes a browser 210 substantialized by, for example, the CPU 210 or a client application 220. Here, the browser 210 can interpret the HTML, and the client application 220 cannot interpret the HTML. Therefore, the client application 220 of the second embodiment generates an application screen based on a data definition received from the service providing system 10 and displays the application screen.

The service providing system 10 of the second embodiment differs from that of the first embodiment in that the function of an application administration unit 120A is different, and a request determination unit 121 is provided.

The request determination unit 121 determines whether the send source is the browser 210 or the client application 220 based on the information received from the image forming apparatus 20.

The application administration unit 120A returns the application screen or the data definition to the image forming apparatus 20 in response to a determination result of the request determination unit 121. Said differently, in a case where the send source is determined as the client application 220 by the request determination unit 121, the application administration unit 120A returns a data definition to the image forming apparatus 20.

<Detailed Process>

Figure 18:
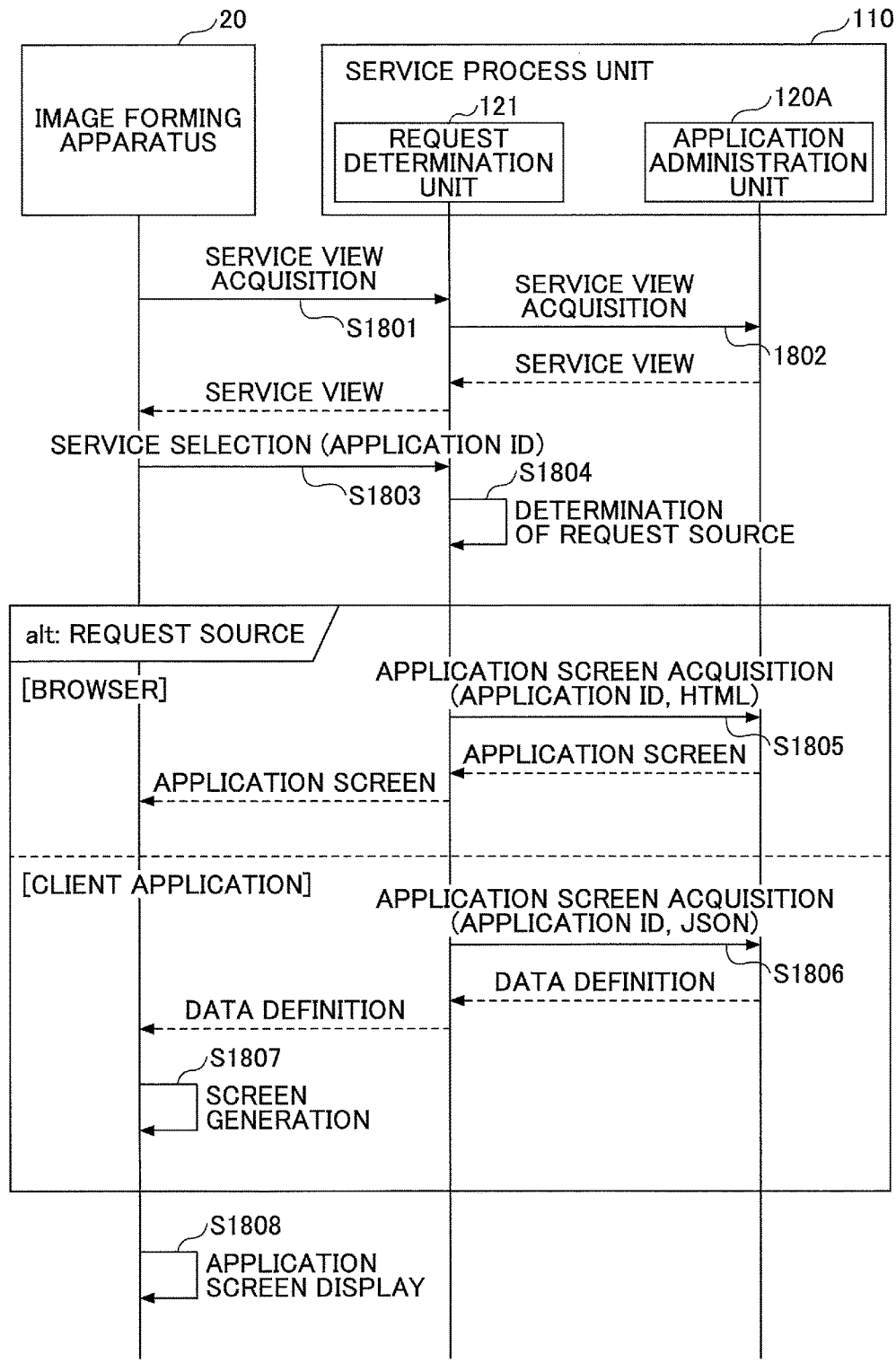
FIG. 18 is a sequence chart of an exemplary display process of an application screen of the second embodiment.

Next, a detailed process of the information processing system 1 of the second embodiment is described. Within the second embodiment, relative to the overall process of the scan delivery service illustrated in FIG. 9 and the overall process of the cloud print service illustrated in FIG. 14, a process for causing the image forming apparatus 20 to display the application screen is different. Within the second embodiment, a process from an acquisition of a service view to a display of an application screen is described. FIG. 18 is a sequence chart of an exemplary display process of the application screen of the second embodiment.

At first, the user of the image forming apparatus 20 conducts an operation of acquiring the service view provided by the service providing system 10 by using the browser 210 or the client application 220. When the request determination unit 121 of the service process unit 110 acquires the service view provided by the service providing system 10 from the application administration unit 120A (step S1802), and sends the acquired service view to the image forming apparatus 20. With this, the service view of services provided by the service providing system 10 is displayed on the operation panel 22 of the image forming apparatus 20.

The user selects a service desired to be used by the user from the service view displayed on the operation panel of the image forming apparatus 20. Then the browser 210 or the client application 220 sends an application ID of application information 1000 for implementing the selected service to the request determination unit 121 (step S1803).

Then, the request determination unit 121 determines whether the send source is the browser 210 or the client application 220 (step S1804). The request determination unit 121 can be determined based on, for example, User Agent. Hereinafter, in a case where the send source is determined to be the browser 210 by the request determination unit 121, a process of step S1805 is executed. Meanwhile, in a case where the send source is determined to be the client application 220, processes of steps S1805 and S1807 are executed.

In a case where the request determination unit 121 determines that the send source is the browser 210, the request determination unit 121 requests the application administration unit 120A to acquire the application screen of HTML (step S1805). This request includes the application ID of the application information 1000 for substantializing the service selected in step S1803. Then, the application administration unit 121A generates the application screen of HTML format based on the screen definition included in the application information 1000 of the application ID included in the request, and sends the generated application screen to the browser 210 through the request determination unit 121.

In a case where it is determined that the send source is the client application 220, the request determination unit 121 requests the application administration unit 120A to acquire a general-purpose data format such as a JavaScript Object Notation (JSON) format (step S1806). This request includes the application ID of the application information 1000 for substantializing the service selected in step S1803. Then, the application administration unit 121A sends the data definition included in the application information 100 of the application ID included in the request to the client application 220 through the request determination unit 121 in a JSON format. As described, in a case where the client application 220 which cannot interprets HTML is installed in the image forming apparatus 20, the service providing system 10 returns only the data definition included in the screen definition. The client application 220 of the image forming apparatus 20 generates the application screen based on the data definition of the received JSON format (step S1807).

Then, the image forming apparatus 20 causes the operation panel 22 to display the application screen 22 (step S1808). In a case where the browser 210 is installed in the image forming apparatus 20, the application screen of the HTML format received in the above step S1805 is displayed.

On the other hand, in a case where the client application 220 is installed in the image forming apparatus 220, the application screen generated in the above step S1807 is displayed. With this, the browser 210 is not necessarily installed in the image forming apparatus 20. Therefore, the user may cause the arbitrary client application 220 for using the service provided by the service providing system 10 to be installed in the image forming apparatus 20.

Third Embodiment

Next, the information processing system 1 of a third embodiment is described. The information processing system 1 of a third embodiment differs from the first embodiment in that it is possible to provide a service substantialized by a process content using a component developed by a third vendor or the like. Further, the information processing system 1 of the third embodiment differs from the first embodiment in that the browser 210 of the image forming apparatus 20 is used so that the user may create the process content.

Hereinafter, the component developed by the third vendor or the like is designated as an "external component", and the component previously assembled in the service providing system 10 (said differently, the component described in the first embodiment and the second embodiment) is designated as an "internal component", so as to distinguish the "external component" and the "internal component". Further, when the external component and the internal component are not distinguished, the external component and the internal component are simply referred to as a "component".

Hereinafter, portions having substantially the same functions as those of the first embodiment and portions performing substantially the same processes as those of the first embodiment are designated by the same reference symbols as those of the first embodiment, and description of these portions is omitted.

<System Structure>

Figure 19:
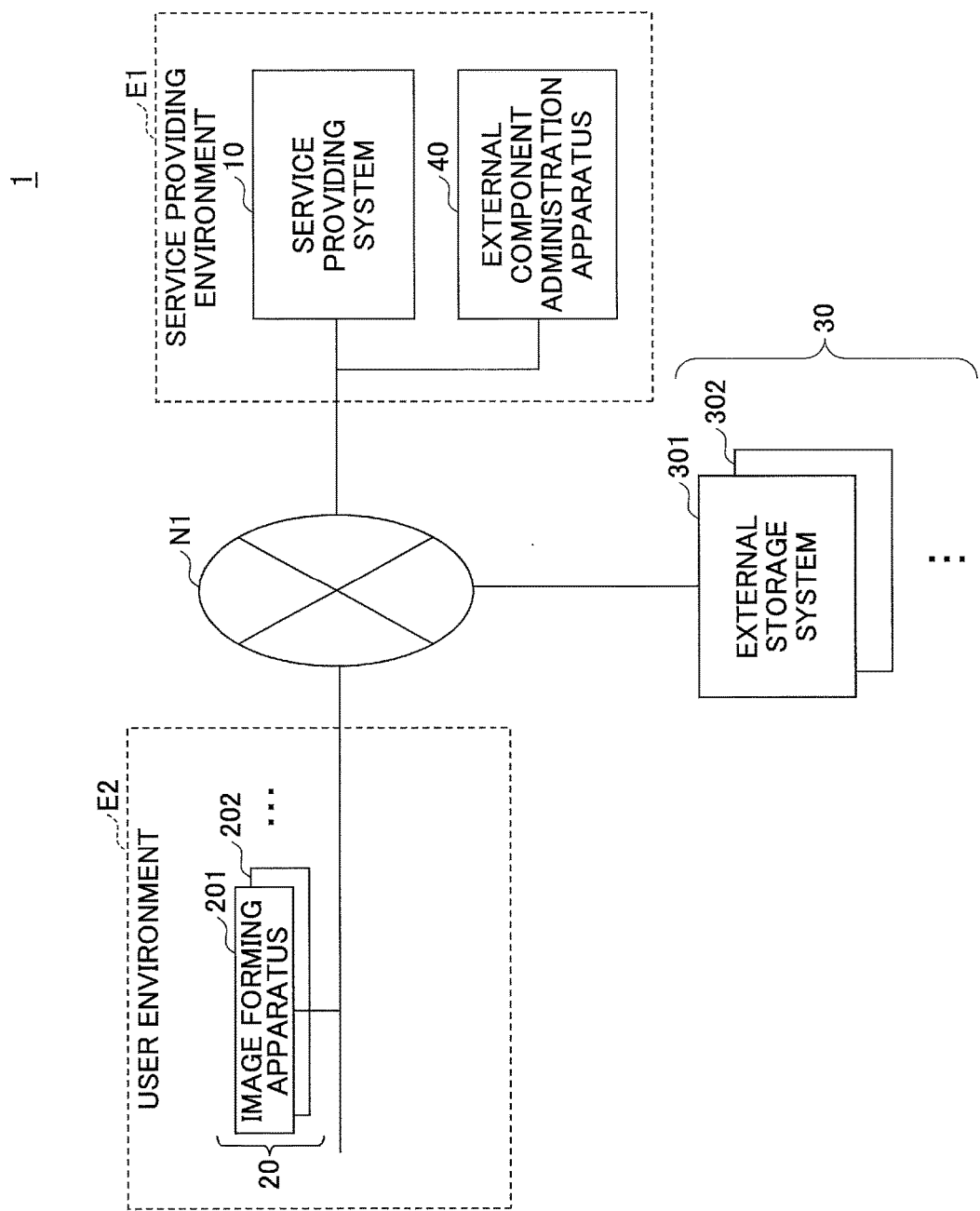
FIG. 19 illustrates a structure of an exemplary information processing system of a third embodiment.

FIG. 19 illustrates an exemplary structure of an information processing system of a third embodiment. In the information processing system 1 illustrated in FIG. 19, the service providing environment E1 further includes an external component administration apparatus 40.

The external component administration apparatus 40 is substantialized by at least one information processing apparatus and administers the external component. As described, in the information processing system 1 of the third embodiment, the external component administration apparatus 40 different from the service providing system 10 administers the external component. Therefore, an influence caused in a case where the external component has a serious bug or the like may be localized into the external component administration apparatus 40.

Referring to FIG. 19, illustrated is an example where one external component administration apparatus 40 is included in the service providing environment E1. However, the embodiment is not limited thereto. Multiple external component administration apparatuses 40 may be included in the service providing environment E1. For example, the service providing environment E1 may include an external component administration apparatus 401 for administering an external component developed by a company A, an external component administration apparatus 402 for administering an external component developed by a company B, and so on.

<Software Structure>

Figure 20:
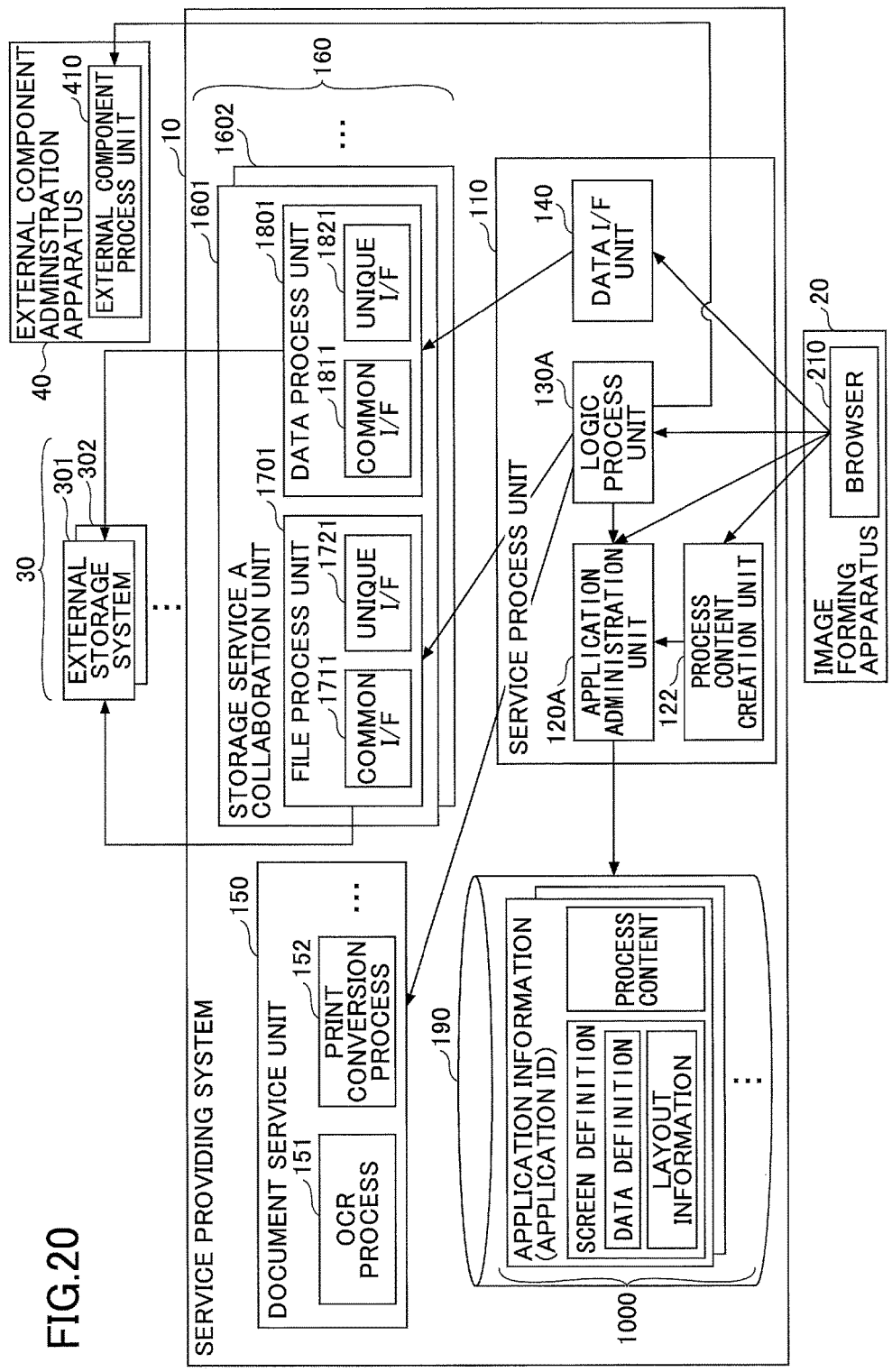
FIG. 20 is a processing block diagram of an exemplary information processing system of the third embodiment.

The information processing system 1 of the third embodiment is substantialized by processing blocks illustrated in, for example, FIG. 20. FIG. 20 is a processing block diagram of an exemplary information processing system of the third embodiment.

A service process unit 110 of the service providing system 10 includes an application administration unit 120A, a logic process unit 130A, and a process content creation unit 122.

The process content creation unit 122 creates a screen (a creation screen for a process content) for creating the process content in response a request from the browser 210.

The application administration unit 120A causes the process content created on the creation screen of the process content to be stored in the application information memory unit 190 in response to a request from the process content creation unit 122. With this, a service substantialized by a series of processes corresponding to the process content created by the user is added.

In a case where the series of processes corresponding to the process content acquired from the application administration unit 120A includes a process executed by the external component, the logic process unit 130A requests the external component process unit 410 to execute the process. A detailed process block of the logic process unit 130A is described later in detail.

The external component administration apparatus 40 includes an external component process unit 410. The external component process unit 41 is substantialized by a CPU provided by, for example, the external component administration apparatus 40.

The external component process unit 410 executes the external component in response to a request from the logic process unit 130A. A detailed process block of the external component process unit 410 is described later in detail.

Figure 21:
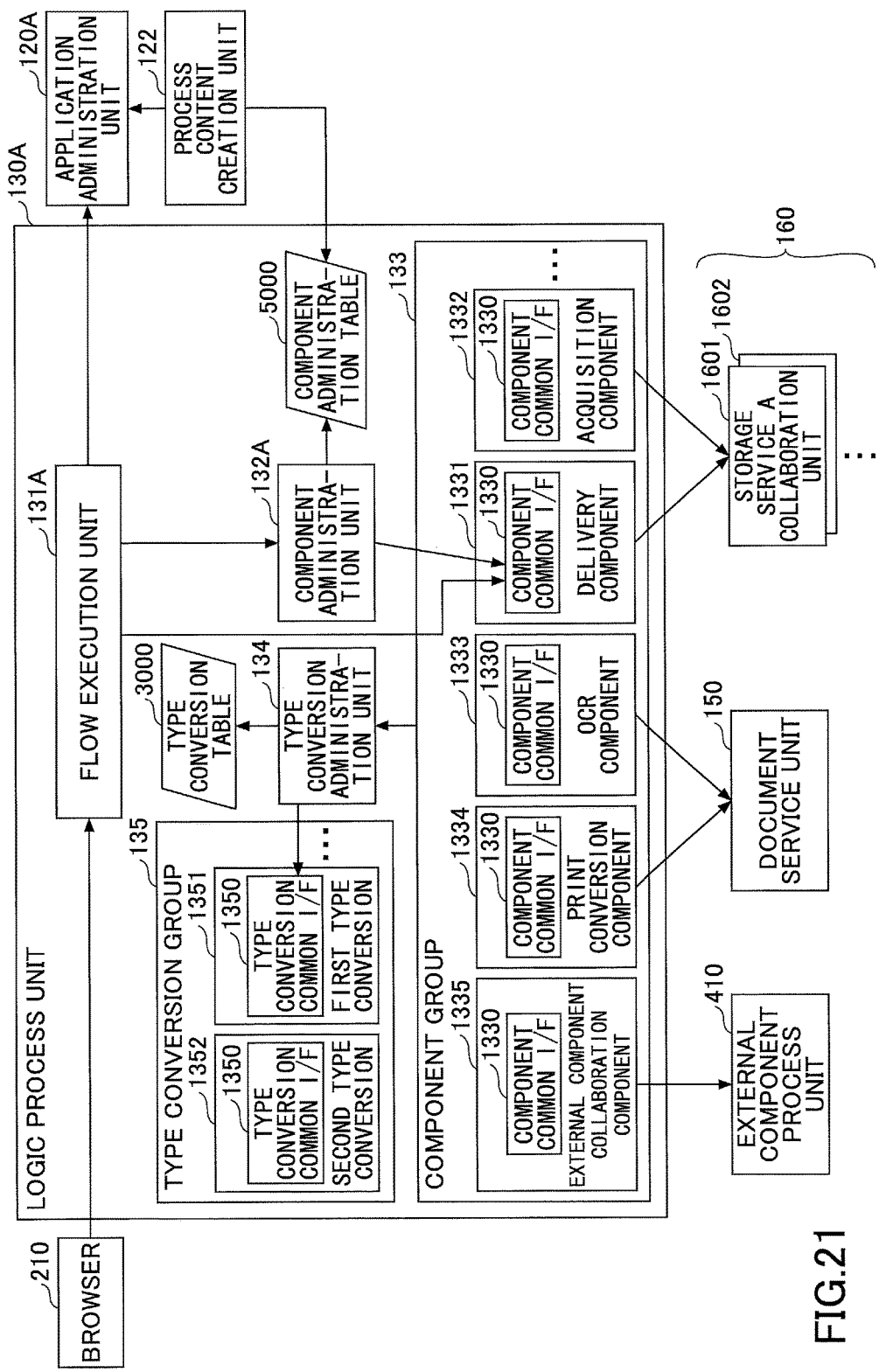
FIG. 21 is a processing block diagram of an exemplary logic process unit of the third embodiment.

Next, the detailed process block of the logic process unit 130A related to the third embodiment is described in detail. FIG. 21 is a processing block diagram of an exemplary logic process unit of the third embodiment.

The logic process unit 130A includes a flow execution unit 131A and a component administration unit 132A. Further, the component group 133 of the logic process unit 130A of the third embodiment includes an external component collaboration component 1335. Further, the logic process unit 130A of the third embodiment uses a component administration table 5000.

The flow execution unit 131A requests the component administration unit 132A to acquire a component in conformity with the process content acquired from the application administration unit 120A. At this time, the flow execution unit 131A requests to acquire the component by designating the component name described later based on the process content.

In response to a request from the flow execution unit 131A, the component administration unit 132A refers to the component administration table 5000 and determines whether the requested component is the internal component or the external component. In a case where the requested component is the external component, the component administration unit 132A generates the external component collaboration component.

An external component collaboration component 1335 included in the component group 133 is a component for a collaboration between the external component process unit 401 of the external component administration apparatus 40 and the process. The external component collaboration component 1335 requests the external component process unit 410 to execute a process of the external component. The external component collaboration component 1335 includes a component common I/F 1330.

Here, the component administration table 5000 includes a data item illustrated in FIG. 22. FIG. 22 illustrates an exemplary component administration table.

The component administration table 5000 illustrated in FIG. 22 includes a component ID, a component name, and a host name as data items. The component ID is identification information uniquely identifying the component. The component name is the name of the component. Within the first embodiment, the component name is uniquely given to the component.

The host name is information for identifying an apparatus administering the component. Said differently, for example, the internal component is associated with a host name "localhost", wherein it is indicated that the internal component is administered by the service providing system 10. Meanwhile, for example, the external component is associated with a host name "server2.com", wherein it is indicated that the external component is administered by the external component administration apparatus 40.

As described, the host names of the apparatuses administering each component are associated in the component administration table 5000. The process content creation unit 122 creates the creation screen of the process content by acquiring a component view from the component administration table 5000.

Figure 23:
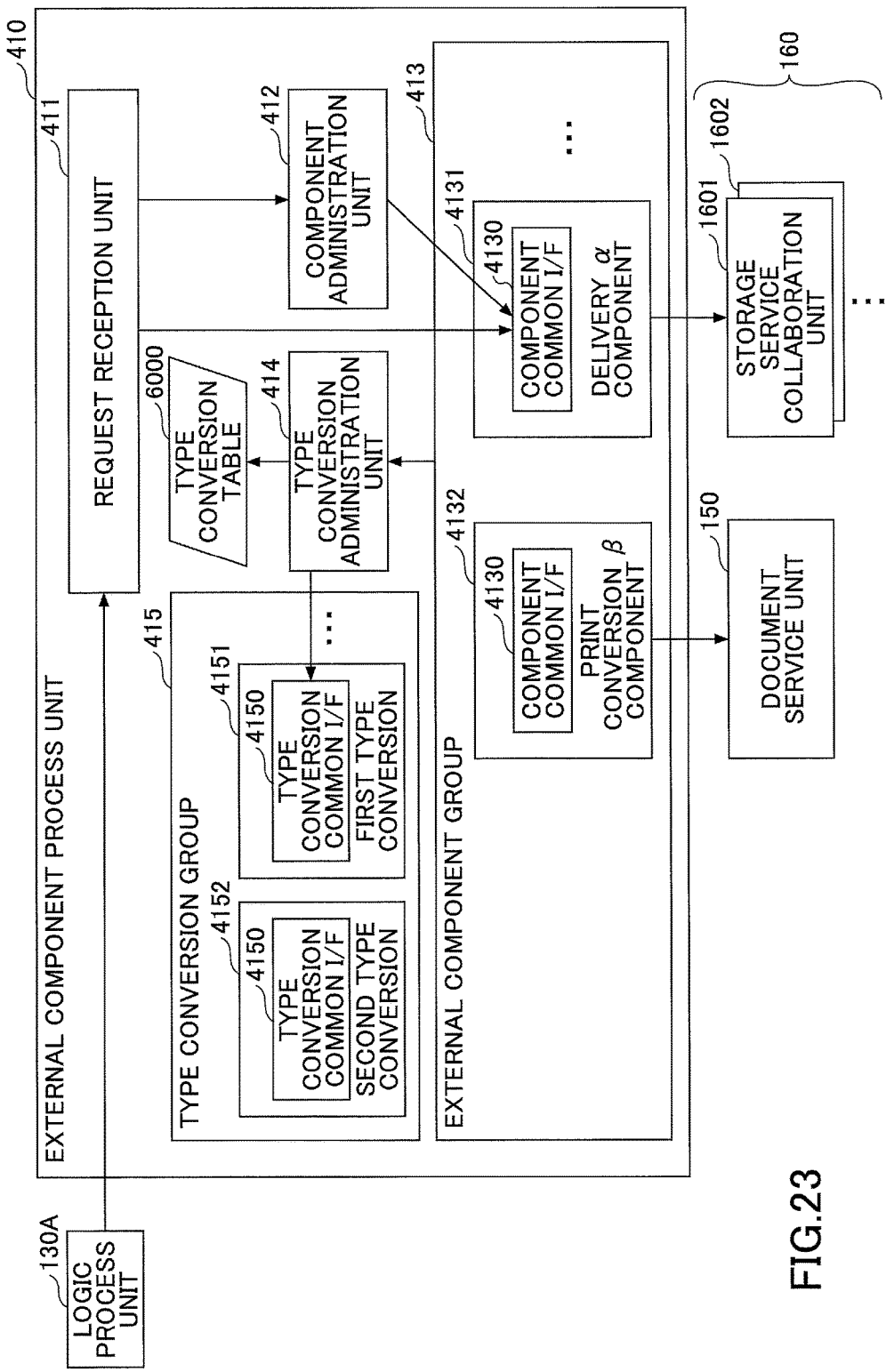
FIG. 23 is a processing block diagram of an external component process unit of the third embodiment.

A detailed process block of the external component process unit 410 is described later in detail. FIG. 23 is a processing block diagram of an exemplary external component process unit of the third embodiment.

The external component process unit 410 includes a request reception unit 411, a component administration unit 412, an external component group, a type conversion administration unit 414, and a type conversion group 415. Further, the external component process unit 410 uses the type conversion table 6000.

When the request reception unit 411 receives a request from the logic process unit 130A, the request reception unit 411 requests the component administration unit 412 to generate the external component. When the external component is generated, the request reception unit 411 requests the external component to execute the process.

The component administration unit 412 generates the external component in response to the request from the flow execution unit 411.

The external component group 413 is a set of the external component. The external component group 413 includes various external components developed by a third vendor or the like. For example, the external component group 413 includes a delivery α component 4131 for delivering the electronic file to the external storage system 30 and a print conversion β component 4132 for converting the electronic file to the print data.

Further, these external components include a component common I/F 4130. The component common I/F 4130 is an API defined for each external component in common, and includes an API for generating the external component and an API for requesting the external component to execute the process.

The type conversion administration unit 414 administers a type conversion of the data type. A data type which can be handled by each external component is previously determined. Therefore, the type conversion administration unit 414 generates a type conversion defined in the type conversion group 415 by referring to the type conversion table 6000 illustrated in FIG. 24 in response to a request from the external component. The type conversion administration unit 414 requests to execute a type conversion process for the generated type conversion.

The type conversion group 415 is a set of the type conversion. The type conversion group 415 includes a first type conversion 4151 converting the data type "LocalFilePath" to "File" and a second type conversion 4142 converting "LocalFilePath" to "File".

Further, these type conversions include a type conversion common I/F 4150. The type conversion common I/F 4150 is an API defined for each type conversion in common, and includes an API for generating the type conversion and an API for requesting the type conversion to execute the process.

<Detailed Process>

Described next is a detailed process of the information processing system 1 of the third embodiment. Within the third embodiment, described is a case where the series of processes substantializing the scan delivery service includes a process of executed by the external component. Said differently, the scan delivery service of the third embodiment is substantialized by a series of processes formed by a process executed by the internal component and a process executed by the external component.

<<Processes from OCR to Delivery Execution>>

Figure 25:
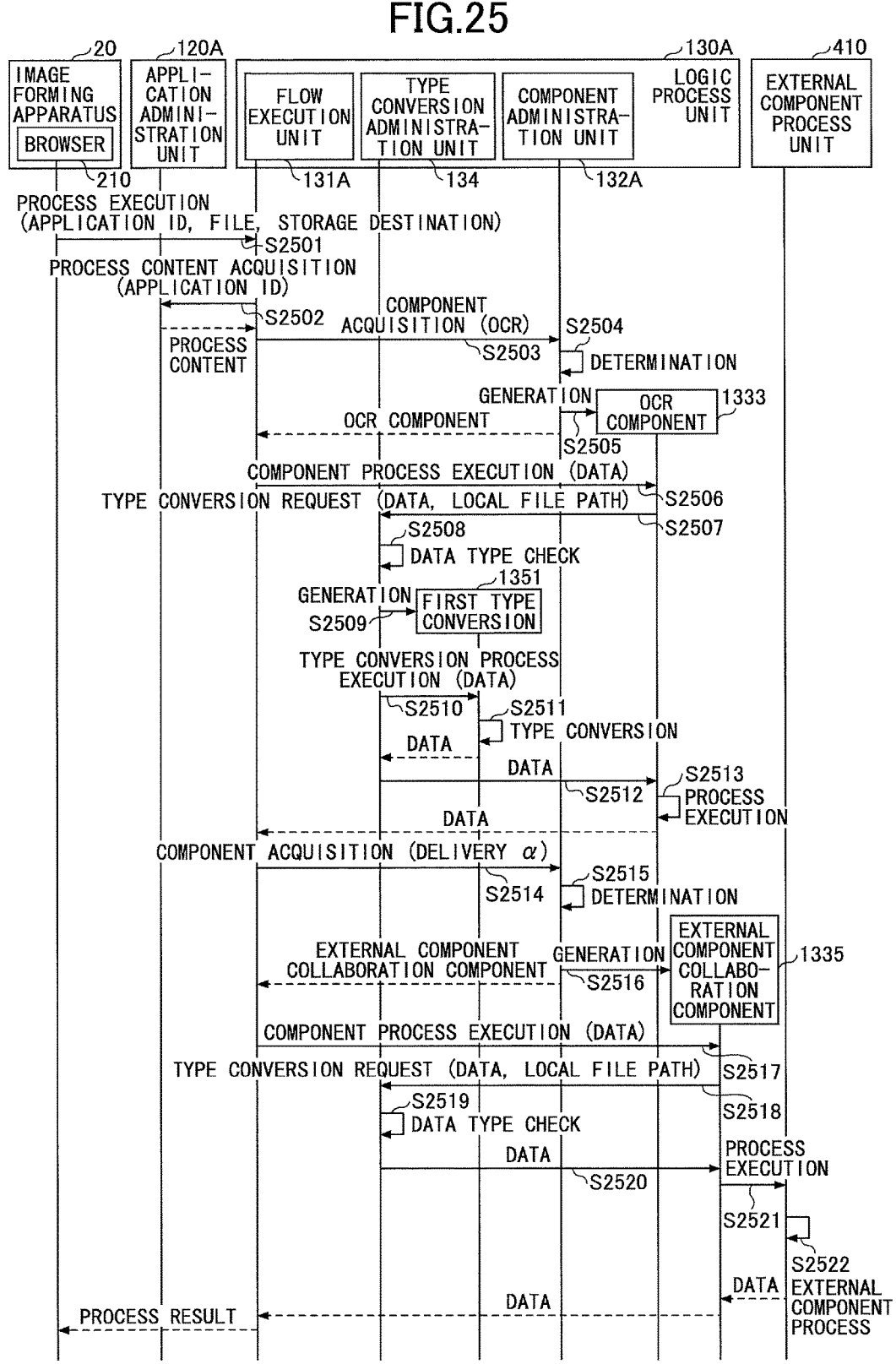
FIG. 25 illustrates a sequence chart of an exemplary process from an OCR to a delivery execution of the third embodiment.

FIG. 25 is a sequence chart of an exemplary process from an OCR to a delivery execution of the third embodiment. Because a process of step S2501 is similar to the process of step S1301 illustrated in FIG. 13, description thereof is omitted.

When the flow execution unit 131A receives an execution request for executing the scan delivery service from the browser, the flow execution unit 131A requests the application administration unit 120A to acquire the process content (step S2502). Here, within the third embodiment, the process content illustrated in FIG. 26 is acquired by the flow execution unit 131.

The flow execution unit 131A requests the component administration unit 132A to acquire the component in conformity with the acquired process content (step S2503). More specifically, the flow execution unit 131 requests the component administration unit 132 to acquire the a component having a component name "ocr" based on ".to("process:ocr")" designated next to "From("file:input")" of the process content illustrated in FIG. 26.

When the component administration unit 132A receives an acquisition request of acquiring the component, the component administration unit 132A refers to the component administration table 5000 and determine whether the component corresponding to the acquisition request is the internal component or the external component (step S2504).

Said differently, the component administration unit 132A determines whether the host name associated with the component name included in the acquisition request is "localhost" in the component administration table 5000. Then, in a case where the host name is "localhost", the component administration unit 132A determines that the component related to the acquisition request is the internal component. On the other hand, in a case where the host name is not "localhost", the component administration unit 132A determines that the component related to the acquisition request is the external component.

In the component administration table 5000, the host name associated with the component name "ocr" is "localhost". Therefore, the component administration unit 132A determines that the component related to the acquisition request is the internal component.

In a case where the component related to the acquisition request of acquiring the component, the component administration unit 132A generates the internal component corresponding to the component name included in the acquisition request (step S2505). Said differently, the component administration unit 132A generates the OCR component 1333 corresponding to the component name "ocr" included in the acquisition request.

Then, the component administration unit 132A returns the generated OCR component 1333 to the flow execution unit 131A.

Because the subsequent process of steps S2506 to S2513 is similar to the process of steps S1305 to S1312 illustrated in FIG. 13, description thereof is omitted.

Next, the flow execution unit 131A requests the component administration unit 132A to acquire the component in conformity with the acquired process content (step S2514). More specifically, the flow execution unit 131A requests the component administration unit 132A to acquire the a component having a component name "send_to_folderα" based on ".to("storage:send_ to_folderα?type=service-b")" designated next to ".to("process:ocr")" of the process content illustrated in FIG. 26. Here, a portion of "?type=service-b" of the designated process content is an option parameter, which indicates that the upload destination of the data in the process of the component having the component name "send_ to_folderα" is the "storage service B".

When the component administration unit 132A receives an acquisition request of acquiring the component, the component administration unit 132A refers to the component administration table 5000 and determine whether the component corresponding to the acquisition request is the internal component or the external component (step S2515).

Said differently, the component administration unit 132A determines whether the host name associated with the component name included in the acquisition request is "localhost" in the component administration table 5000. Then, in a case where the host name is "localhost", the component administration unit 132A determines that the component related to the acquisition request is the internal component. On the other hand, in a case where the host name is not "localhost", the component administration unit 132A determines that the component related to the acquisition request is the external component.

In the component administration table 5000, the host name associated with the component name "send_to_folderα" is "server2.com". Therefore, the component administration unit 132A determines that the component related to the acquisition request is the external component.

In a case where the requested component is determined to be the external component, the component administration unit 132A generates the external component collaboration component 1335 (step S2516).

As described, in a case where the component related to the acquisition request of the component is the external component, the service providing system 10 of the third embodiment generates the external component collaboration component 1335.

Then, the component administration unit 132A returns the generated external component collaboration component 1335 to the flow execution unit 131A.

The flow execution unit 131A requests the generated external component collaboration component 1335 to execute the process while designating the data (step S2517). Here, the data type of the designated data is "LocalFilePath".

The external component collaboration component 1335 requests the type conversion administration unit 134 to perform a type conversion (step S2518). Here, the type conversion request includes the data and a designation of "LocalFilePath" indicative of a data type, which can be treated by the external component collaboration component 1335.

The type conversion administration unit 134 checks whether the data type of the data included in the received type conversion request matches the designated data type (step S2519). Here, because the data type of the data included in the received type conversion request is "LocalFilePath" and the designated data type is "LocalFilePath", it is determined that the data type of the data included in the received type conversion request matches the designated data type. Then, the type conversion administration unit 134 sends the data included in the type conversion request directly to the external component collaboration component 1335 (step S2520).

When the external component collaboration component 1335 receives the data from the type conversion administration unit 134, the external component collaboration component 1335 executes the process (step S2521). Said differently, the external component collaboration component 1335 requests the external component process unit 410 of the external component administration apparatus 40 indicated by the host name "server2.com" to execute the process including the component name "send_to_folderα" and the data. The execution request includes the above described option parameter "?type=service-b" indicative of the storage service of the upload destination.

Next, when the external component process unit 410 receives the execution request of the process from the external component collaboration component 1335, the external component process unit 410 executes the external component process in response to the execution request (step S2522). Then, the external component process unit 410 returns the data indicative of the process result.

Figure 27:
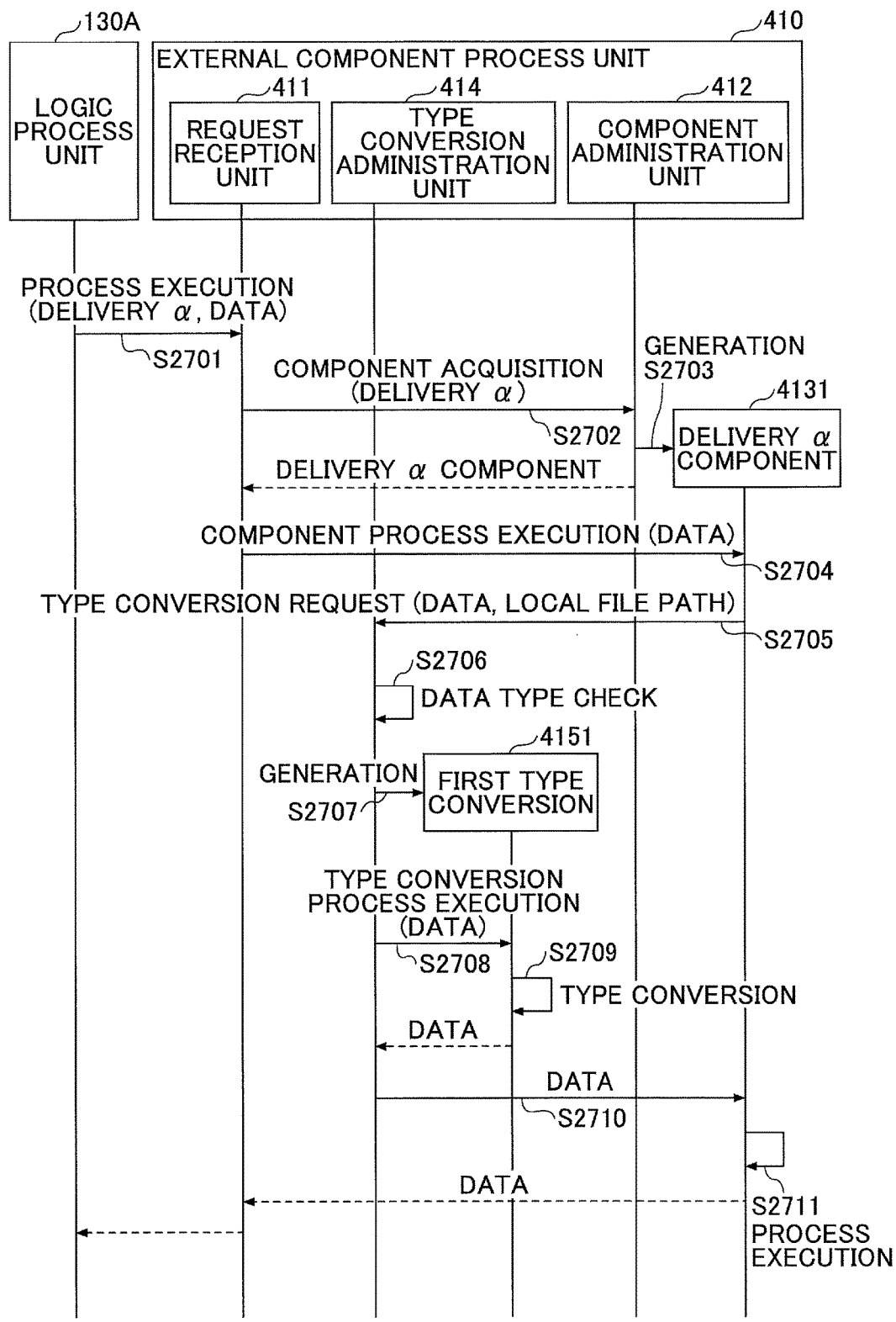
FIG. 27 is a sequence diagram of an exemplary external component process of the third embodiment.

Described next is a detailed process of step S2522. FIG. 27 is an exemplary sequence diagram of an external component process of the third embodiment.

At first, the request reception unit 411 receives an execution request from the logic process unit 130A (more specifically, the external component collaboration component 1335) (step S2701). The execution request includes a component name "send_ to_ folderα" of the external component, the data, and the option parameter "?type=service-b".

In a case where the option parameter is not designated into the process content, the execution request of the process does not include the option parameter. Further, the data included in the execution request is transferred as the data has the data type "InputStream".

When the request reception unit 411 receives the execution request of executing the process, the request reception unit 411 requests the component administration unit 412 to acquire the external component having the component name "send_ to_folderα" included in the execution request (step S2702).

When the component administration unit 412 receives an acquisition request of acquiring the external component, the component administration unit 412 generates the delivery α component 4131 corresponding to the component name "send_to_folderα" included in the acquisition request (step S2703). The delivery α component 4131 is generated by using the API for generating the component defined by the component common I/F 4330.

Then, the component administration unit 412 returns the generated delivery α component 4131 to the request reception unit 411. For example, the component administration unit 412 returns the address in the memory (e.g., the RAM 14), on which the delivery component 4131 is deployed, to the request reception unit 411.

The request reception unit 411 requests the generated delivery α component 4131 to execute the process while designating the data (step S2704).

When the delivery α component 4131 receives the execution request of executing the process, the delivery α component 4131 requests the type conversion administration unit 414 to perform the type conversion (step S2705). Here, the type conversion request includes the data and a designation of "LocalFilePath" indicative of a data type, which can be treated by the delivery α component 4131.

The type conversion administration unit 414 checks whether the data type of the data included in the received type conversion request matches the designated data type (step S2706). Here, because the data type of the data included in the received type conversion request is "InputStream" and the designated data type is "LocalFilePath", it is determined that the data type of the data included in the received type conversion request does not match the designated data type.

Then, the type conversion administration unit 414 specifies a type conversion for converting "InputStream" to "LocalFilePath" (here, the first type conversion 4151 is specified) by referring to the type conversion table 6000, and generates the specified type conversion (step S2707).

Then, the type conversion administration unit 414 requests the generated first type conversion 4151 to perform the type conversion process while designating the data (step S2708). Then, the first type conversion 4151 coverts the data type of the designated data from "InputStream" to "LocalFilePath" (step S2709), and returns the converted data to the type conversion administration unit 414.

Thereafter, the type conversion administration unit 414 sends the data provided with the type conversion to the delivery α component 4131 (step S2710).

When the delivery α component 4131 receives the data from the type conversion administration unit 414, the delivery α component 4131 executes the process (step S2711). Said differently, within the third embodiment, the delivery α component 4131 executes a data delivery to the storage service B.

Here, the delivery α component 4131 delivers the data to the storage service B without passing through the storage service B collaboration unit 1602. As described, unlike the internal component, the external component executes various processes such as the delivery process and the OCR process without using the storage service collaboration unit 160 and the document service unit 150. However, the embodiment is not limited thereto. In a manner similar to the internal component, the external component may execute various processes by sending a process request of requesting the storage service collaboration unit 160 and the document service unit 150 to process.

Then, the delivery α component 4131 returns the data indicative of the process result. Thus, the scan delivery service of the third embodiment is completed.

As described, in a case where the process content includes the process executed by the external component, the service providing system 10 of the third embodiment requests the external component administration apparatus 40 administering the external component to execute the process. The external component is executed by the external component administration apparatus 40, which is an apparatus different from the service providing system 10.

Therefore, even in a case where a serious bug, a defect, or the like exist in the external component developed by a third vendor or the like, an influence caused by the serious bug, the defect, or the like may be localized inside the external component administration apparatus 40. Said differently, the service providing system 10 may continuously provide the service without suffering from the influence caused by the serious bug, the defect, or the like of the external component.

Within the third embodiment, the external component is administered by the external component administration apparatus 40. However, the external component may be administered by the service providing system 10 after the quality of the external component is ensured.

<<Creation Process of Process Content>>

Figure 28:
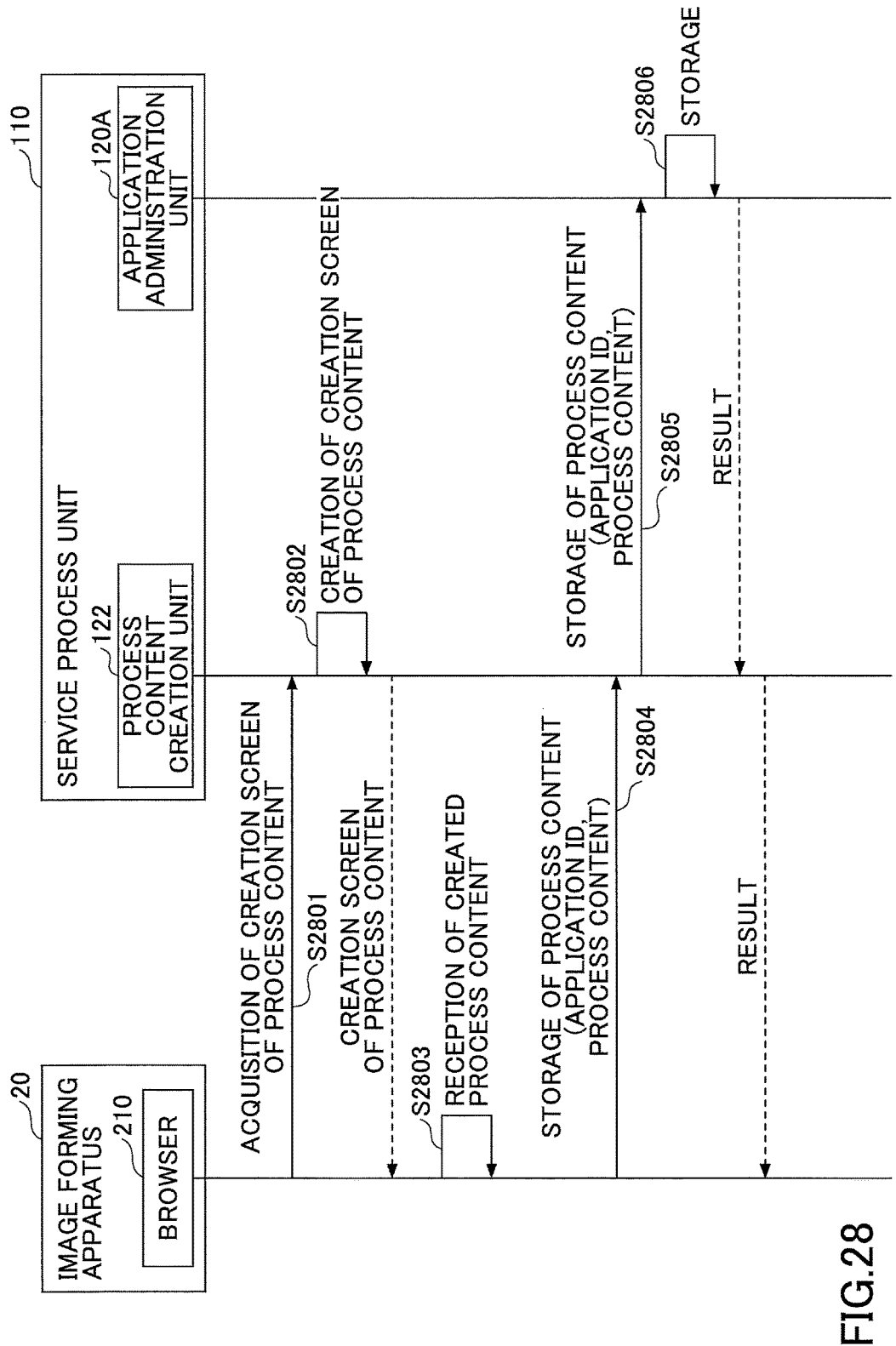
FIG. 28 is a sequence diagram of an exemplary creation process of a process content of the third embodiment.

Described next is a creation process of creating by a user such as a developer of the application information 1000 or the like a process content included in the application information. FIG. 28 is a sequence diagram of an exemplary creation process of a process content of the third embodiment.

At first, a user of the image forming apparatus 20 uses the browser 210 to operate to display a creation screen of the process content. Then, the browser 210 of the image forming apparatus 20 requests the process content creation unit 122 to acquire the creation screen of the process content (step S2801).

Figure 29:
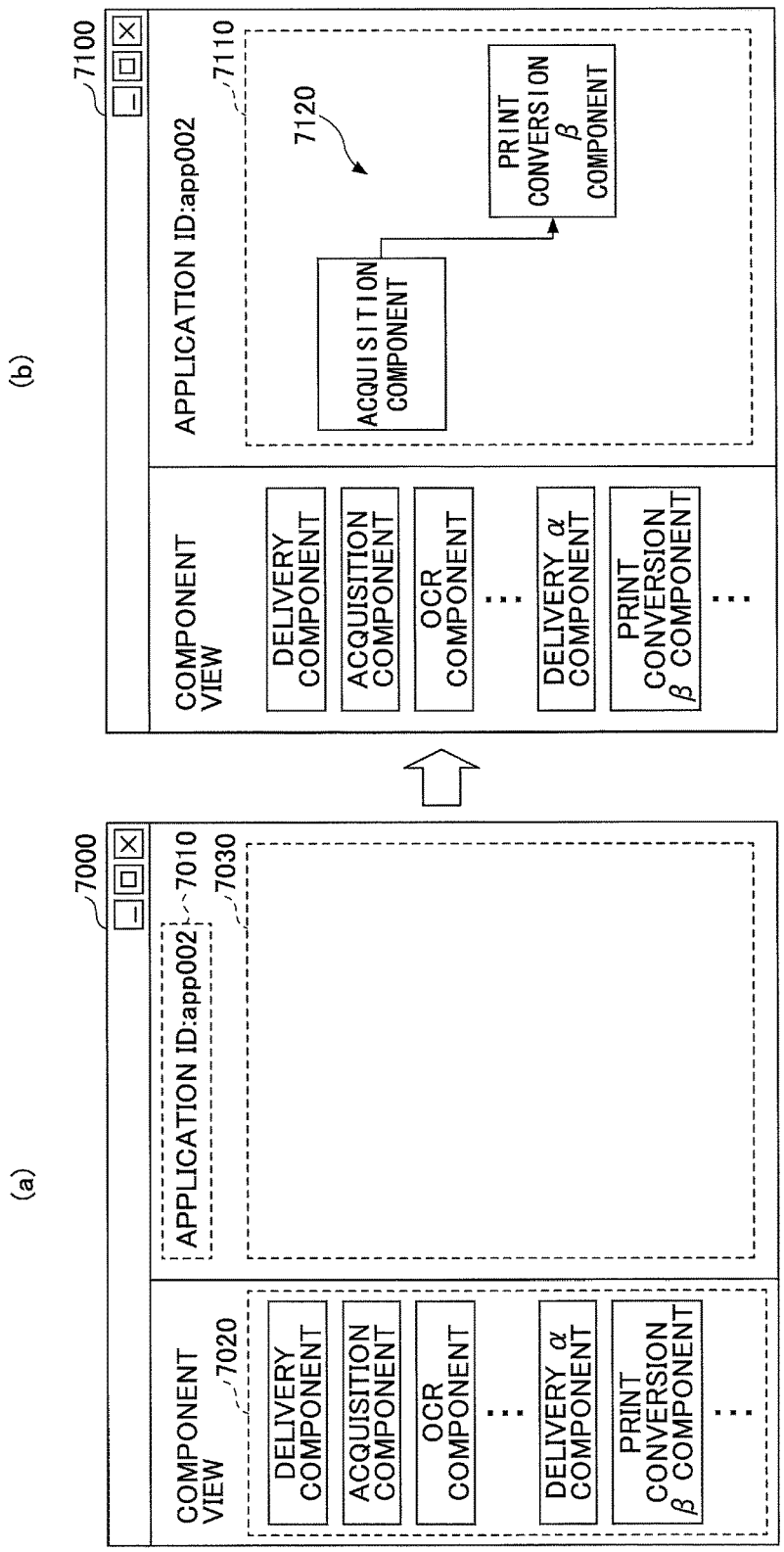
FIG. 29 illustrates an exemplary creation of the process content.

The process content creation unit 122 acquires a component view (e.g., a view of component names) from the component administration table 500 and creates a creation screen 7000 of a process content as illustrated in (a) of FIG. 29 (step S2802). The process content creation unit 122 returns the creation screen 7000 of the process content that is created to the browser 210.

Here, the creation screen 7000 of the process content illustrated in (a) of FIG. 29 includes an application ID display column 7010, a component display column 7020, and a process content creation column 7030.

The application ID display column 7010 displays the application ID of the application information 1000, in which the process content to be created. This application ID may be designated by the user in, for example, the above step S2801.

Icons (display parts) respectively indicate the components are displayed in the component display column 7020 as a view. The view of the icons indicative of the components is created based on the component names acquired from the component administration table 5000. The process content creation column 7030 is an area where the user creates the process content. For example, the process content may be created by drag and drop of the icon included in the component display column.

Here, the user conducts the drag and drop for the acquisition component and the print conversion β component, which are included in the component display column 7020, in this order onto the process content creation column 7030 by using the browser 210. Then, as illustrated in (b) of FIG. 29, a flowchart 7120 schematically illustrating the process content is created in the process content creation column 7110 of the creation screen 7100 of the process content. The flowchart 7120 indicates the process content executing the print conversion β component, which is the external component, after executing the acquisition component being the internal component.

With this, the process content is created by the user. At this time, the user may create the process content without convincing whether the component executing the series of processes included in the process content is the internal component or the external component. Therefore, the user may easily create the process content.

The user creates the process content, the browser 210 of the image forming apparatus 20 receives the created process content (step S2803). Then, the browser 210 of the image forming apparatus 20 requests the process content creation unit 122 to store the created process content (step S2804). This storage request to store the created process content includes the application ID and the process content created by the user.

The process content creation unit 122 of the service process unit 110 transfers the storage request to store the process content to the application administration unit 120A after receiving the storage request (step S2805). Next, when the application administration unit 120A receives the storage request to store the process content, the application administration unit 120A stores the process content included in the storage request into the application information memory unit 190 in association with the application information memory unit 190 (step S2806). Then, the application administration unit 120A returns a storage result. With this, the process content created by the user is stored in the application information memory unit 190.

<General Overview>

As described, according to the information processing system 1 of the first embodiment, the service providing system 10 may provide a service collaborating with the external service to the image forming apparatus 20. Further, the service providing system 10 may easily add or change the external service of the collaboration destination. Further, the service providing system 10 may easily add or change a service (i.e., add or change the application information 1000) provided to the image forming apparatus 20. With this, the service providing system 10 of the first embodiment may reduce a man-hour for a development and a maintenance caused by an addition and a change of the service.

As described, according to the information processing system 1 of the second embodiment, the service providing system 10 may provide a service to the image forming apparatus 20, in which the browser 210 is not installed. Therefore, according to the service providing system 10 of the second embodiment, it is possible to provide a service to various electronic apparatuses, which are ordinarily provided with no browser.

According to the information processing system 1 of the third embodiment, the external component developed by a third vendor or the like may be administered and executed by the external component administration apparatus 40, which is different from the service providing system 10. With this, in a case where the quality of the external component is insufficient such that a bug or a defect exists in the external component, an influence caused by the bug or the defect may be localized in the external component administration apparatus 40.

Therefore, according to the information processing system 1 of the third embodiment, it is possible to prevent a situation caused by the bug or the defect such that a throughput of the service providing system 10 decreases or the service providing system 10 stops, for example.

The application information memory unit 190 is an example of an application information memory unit in the claims. The application administration unit 120 is an example of an application administration unit of the claims. The logic process unit 130 is an example of logic process unit of the claims.

Within the embodiments, it is possible to support a development of an application for performing a process in collaboration with an external service.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing system has been described in detail, it should be understood that various changes, substitutions, and alterations could be made thereto without departing from the spirit and scope of the invention.

This application is based upon and claims the benefit of priority of the prior Japanese Patent Application No. 2015-027292, filed on Feb. 16, 2015, and the Japanese Patent Application No. 2015-222330, filed on Nov. 12, 2015, the entire contents of which are incorporated herein by reference.

What is claimed is:

1. An information processing system, which includes at least one information processing apparatus and also includes a plurality of programs each executing a predetermined process, the information processing system comprising:
a hardware processor that executes a control program; and
a hardware memory that stores information,
wherein the hardware memory implements an application information memory unit configured to store an identification information piece for identifying an application and a process information piece for executing a series of processes in combination with the plurality of programs for each of the application executing the series of processes, which uses electronic data, in collaboration with an external service while associating the identification information piece and the process information piece,
wherein the hardware processor implements
a service process unit configured to
receive a request including the identification information piece and an electronic data information piece of the electronic data used for the series of processes from one apparatus from among at least one apparatus connected to the information processing system, and
provide a user of a process content creation screen for creating the process information piece for executing the series of processes, receive the process content creation screen including the process information piece for executing the series of processes created by the user, and store the process information piece that is created by the user and included in the process content creation screen into the hardware memory implementing the application information memory unit, and
a logic process unit configured to
read the process information piece stored in the application information memory unit corresponding to the identification information piece included in the request received by the service process unit, and
determine whether the processes specified in the process information piece include a process to be executed by an external component, wherein
the logic process unit executes the processes that are not determined as to be executed by the external component using the electronic data of the electronic data information piece included in the request received by the service process unit and using at least one program from among the plurality of programs or any combination of the plurality of programs based on the read process information piece, and transmits a request to an external component administration apparatus to execute the process determined as to be executed by the external component, and wherein the hardware processor implementing the logic process unit includes at least one type conversion administration unit configured to convert a data type of the electronic data to a predetermined data type, the data type indicating whether the data can be treated by the external component, and the at least one program executes the series of processes using the electronic data based on the process information piece after the data type of the electronic data is converted by the type conversion administration unit to the predetermined data type enabling the at least one program to process by combining the at least one program with the type conversion administration unit.

2. The information processing system according to claim 1, wherein the plurality of programs includes a program of executing a process related to the external service, the program of executing the process related to the external service includes a program of executing a process of uploading the electronic data to the external service, and a program of executing a process of downloading the electronic data from the external service.

3. The information processing system according to claim 2, wherein the external service includes a plurality of external services, wherein the hardware processor of the information processing system further implements an external service collaboration unit provided for each of the plurality of external services including a common API defined in common with the plurality of external services, and a unique API uniquely defined for each of the plurality of external services, wherein the program executing a process related to the external service executes the process related to the external service using the common API and the unique API.

4. The information processing system according to claim 3, wherein the common API is an API for using a function commonly provided by the plurality of external services, wherein the unique API is an API for using a function provided by any one of the plurality of external services.

5. The information processing system according to claim 3, wherein the program executing the process related to the external service executes the process related to the external service corresponding to identification information piece, which is designated by designating the identification information piece of the external service in a variable portion of the common API or the unique API.

6. The information processing system according to claim 1, wherein the information processing system is connected with an external system which has a plurality of external programs respectively execute predetermined processes, wherein the logic process unit executes the series of processes using the electronic data in combination with the at least one program and the external program based on the process information piece.

7. The information processing system according to claim 6, wherein the hardware processor implementing the logic process unit includes a determination unit configured to determine whether one process included in the series of processes is executed by the external program, wherein, in a case where it is determined that the one process is executed by the external program, the logic process unit requests the external system to process using the external program.

8. The information processing system according to claim 1, wherein the hardware processor further implements an application administration unit configured to send a result of the series of processes executed by the logic process unit to the one apparatus.

9. The information processing system according to claim 1, wherein the application includes at least an application of uploading the electronic data sent from the one apparatus to the external service.

10. The information processing system according to claim 8, wherein the application includes at least an application of downloading the electronic data stored in the external service and sending the downloaded electronic data to the one apparatus.

11. The information processing system according to claim 10, wherein the application administration unit sends the electronic data downloaded from the external service to the one apparatus as the result of the series of processes executed by the logic process unit to the one apparatus.

12. The information processing system according to claim 1, wherein the conversion of the data type of the electronic data is the conversion of a first data type to a second data type that is different from the first data type, the first and second data types being selected from among an input stream, a local file path, or a file.

13. An information processing apparatus including a plurality of programs each executing a predetermined process, the information processing apparatus comprising:

a hardware processor that executes a control program; and a hardware memory that stores information, wherein the hardware memory implements an application information memory unit configured to store an identification information piece for identifying an application and a process information piece for executing a series of processes in combination with the plurality of programs for each of the application executing the series of processes, which uses electronic data, in collaboration with an external service while associating the identification information piece and the process information piece, wherein the hardware processor implements
a service process unit configured to
receive a request including the identification information piece and an electronic data information piece of the electronic data used for the series of processes from one apparatus from among at least one apparatus connected to the information processing system, and
provide a user of a process content creation screen for creating the process information piece for executing the series of processes, receive the process content creation screen including the process information piece for executing the series of processes created by the user, and store the process information piece that is created by the user and included in the process content creation screen into the hardware memory implementing the application information memory unit, and
a logic process unit configured to
read the process information piece stored in the application information memory unit corresponding to the identification information piece included in the request received by the service process unit, and
determine whether the processes specified in the process information piece includes a process to be executed by an external component, wherein
the logic process unit executes the processes that are not determined as to be executed by the external component using the electronic data of the electronic data information piece included in the request received by the service process unit and using at least one program from among the plurality of programs or any combination of the plurality of programs based on the read process information piece, and
transmits a request to an external component administration apparatus to execute the process determined as to be executed by the external component, and
wherein
the hardware processor implementing the logic process unit includes at least one type conversion administration unit configured to convert a data type of the electronic data to a predetermined data type, the data type indicating whether the data can be treated by the external component, and
the at least one program executes the series of processes using the electronic data based on the process information piece after the data type of the electronic data is converted by the type conversion administration unit to the predetermined data type enabling the at least one program to process by combining the at least one program with the type conversion administration unit.

14. The information processing apparatus according to claim 13, wherein the conversion of the data type of the electronic data is the conversion of a first data type to a second data type that is different from the first data type, the first and second data types being selected from among an input stream, a local file path, or a file.

15. An information processing method of processing information using an information processing system, the processing system including:
at least one information processing apparatus,
a plurality of programs each executing a predetermined process, and
a hardware memory implementing an application information memory unit configured to store an identification information piece for identifying an application and a process information piece for executing a series of processes in combination with the plurality of programs for each of the application executing the series of processes, which uses electronic data, in collaboration with an external service while associating the identification information piece and the process information piece, the information processing method comprising:
receiving a request including the identification information piece and an electronic data information piece of the electronic data used for the series of processes from one apparatus from among at least one apparatus connected to the information processing system;
providing a user of a process content creation screen for creating the process information piece for executing the series of processes, receiving the process content creation screen including the process information piece for executing the series of processes created by the user, and storing the process information piece that is created by the user and included in the process content creation screen into the hardware memory implementing the application information memory unit;
reading the process information piece stored in the application information memory unit corresponding to the identification information piece included in the request received by the receiving the request; and
determining whether the processes specified in the process information piece includes a process to be executed by an external component, wherein
executing the processes that are not determined as to be executed by the external component using the electronic data of the electronic data information piece included in the request received by the receiving the request and using at least one program from among the plurality of programs or any combination of the plurality of programs based on the read process information piece,
transmitting a request to an external component administration apparatus to execute the process determined as to be executed by the external component, and
converting a data type of the electronic data to a predetermined data type, the data type indicating whether the data can be treated by the external component, wherein
the at least one program executes the series of processes using the electronic data based on the process information piece after the conversion of the data type of the electronic data to the predetermined data type.

16. The information processing method according to claim 15, wherein the conversion of the data type of the electronic data is the conversion of a first data type to a second data type that is different from the first data type, the first and second data types being selected from among an input stream, a local file path, or a file.

* * * * *